United States Patent
Akkarakaran et al.

(10) Patent No.: US 10,505,685 B2
(45) Date of Patent: Dec. 10, 2019

(54) ADAPTING TO DELAY SPREAD VARIATION IN WIRELESS COMMUNICATION SYSTEMS

(71) Applicant: QUALCOMM Incorporated, San Diego, CA (US)

(72) Inventors: Sony Akkarakaran, Poway, CA (US); Tao Luo, San Diego, CA (US); Kaushik Chakraborty, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 15/685,906

(22) Filed: Aug. 24, 2017

(65) Prior Publication Data

US 2018/0062811 A1  Mar. 1, 2018

Related U.S. Application Data

(60) Provisional application No. 62/380,356, filed on Aug. 26, 2016.

(51) Int. Cl.
| | |
|---|---|
| *H04W 24/00* | (2009.01) |
| *H04L 5/00* | (2006.01) |
| *H04L 27/26* | (2006.01) |
| *H04W 24/10* | (2009.01) |
| *H04W 72/04* | (2009.01) |

(52) U.S. Cl.
CPC .......... *H04L 5/0048* (2013.01); *H04L 5/0035* (2013.01); *H04L 27/2607* (2013.01); *H04L 27/2613* (2013.01); *H04W 24/10* (2013.01); *H04W 72/042* (2013.01)

(58) Field of Classification Search
CPC ... H04L 5/0048; H04L 27/2607; H04W 24/00
See application file for complete search history.

(56) References Cited

U.S. PATENT DOCUMENTS

| | | | |
|---|---|---|---|
| 9,450,695 B2 * | 9/2016 | Zhu | H04J 11/0093 |
| 9,459,695 B2 * | 10/2016 | Hsu | G06F 3/005 |

(Continued)

FOREIGN PATENT DOCUMENTS

| | | | | |
|---|---|---|---|---|
| WO | WO2014/126519 | * | 8/2014 | H04L 25/02 |
| WO | WO-2014126519 A1 | * | 8/2014 | H04L 5/0048 |
| WO | WO-2014182133 A1 | * | 11/2014 | H04L 5/0048 |

OTHER PUBLICATIONS

Berardinelli G., et al., "Zero-Tail DFT-Spread-OFDM Signals", 2013 IEEE Globecom Workshops (GC Wkshps); IEEE, Dec. 9, 2013 (Dec. 9, 2013), XP032600025, pp. 229-234.

(Continued)

*Primary Examiner* — Myron Wyche
(74) *Attorney, Agent, or Firm* — Holland & Hart LLP; Clint R. Morin

(57) ABSTRACT

Methods, systems, and devices for wireless communication are described. A user equipment (UE) and base station may dynamically update a reference signal pattern, a symbol prefix configuration, or both based on channel propagation conditions such as a delay spread, multipath propagation, or frequency selectivity. In some cases, the UE may measure the channel propagation conditions and send an indication to the base station. The base station may then update the reference signal pattern or symbol prefix configuration accordingly, and send an indication of the new configuration to the UE. In some cases, i.e., for uplink communications, the base station may measure the channel propagation conditions directly, update the reference signal pattern or symbol prefix configuration, and then send a request to the UE to send subsequent reference signals or data communications based on the updated configuration.

30 Claims, 18 Drawing Sheets

(56) References Cited

U.S. PATENT DOCUMENTS

| | | | | |
|---|---|---|---|---|
| 2012/0281551 | A1* | 11/2012 | Alanara | H04L 27/2607 |
| | | | | 370/252 |
| 2013/0022090 | A1 | 1/2013 | Weng et al. | |
| 2013/0315321 | A1* | 11/2013 | Rajagopal | H04L 27/2607 |
| | | | | 375/260 |
| 2015/0282123 | A1* | 10/2015 | Miao | H04W 48/00 |
| | | | | 455/450 |
| 2016/0127094 | A1 | 5/2016 | Jiang et al. | |

OTHER PUBLICATIONS

International Search Report and Written Opinion—PCT/US2017/048543—ISA/EPO—dated Jan. 24, 2018.
3GPP TS 36.331: 3rd Generation Partnership Project; Technical Specification Group Radio Access Network; Evolved Universal Terrestrial Radio Access (E-UTRA); Radio Resource Control (RRC); Protocol Specification, Release 11, V11.16.0, Jun. 2016, XP051123196, 360 pages.
Partial International Search Report—PCT/US2017/048543—ISA/EPO—dated Oct. 18, 2017.
CMCC: "General Views on Reference Signal Design", R1-164892, 3GPP TSG RAN WG1 Meeting #85, 7.1.6 Nanjing, China May 23-27, 2016, pp. 1-4.
Huawei: "Forward Compatibility Consideration on Reference Signals and Control Information/Channels", R1-164046, 3GPP TSG RAN WG1 Meeting #85, 7.1.1, Nanjing, China, May 23-27, 2016, pp. 1-3.
Qualcomm: "Design Options for Longer Cyclic Prefix for MBSFN Subframes", R1-164439, 3GPP TSG RAN WG1 Meeting #85, 6.2.5.1, Nanjing, China May 23-27, 2016, pp. 1-4.

\* cited by examiner

ADAPTING TO DELAY SPREAD VARIATION IN WIRELESS COMMUNICATION SYSTEMS

CROSS REFERENCES

The present Application for Patent claims priority to U.S. Provisional Patent Application No. 62/380,356 by Akkarakaran, et al., entitled "Adapting to Delay Spread Variation in MMW Systems," filed Aug. 26, 2016, assigned to the assignee hereof.

BACKGROUND

The following relates generally to wireless communication, and more specifically to adapting to delay spread variation in wireless communication systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless communication systems may operate in millimeter wave spectrum. Millimeter wave communication may be sensitive to channel conditions such as frequency selectivity due to multipath propagation. Some wireless systems using millimeter wave communication may use analog beamforming to improve signal quality and reduce path loss. Some beamforming configurations may impact a typical channel delay spread for millimeter wave communication systems. Beamforming may use either a narrow transmit beam or broad transmit beam based on the channel conditions. For example, a broad transmit beam may improve channel quality by using multiple reflected paths. However, using the broad transmit beam may use additional multipath and increase the delay spread when compared to a narrow beam.

SUMMARY

A user equipment (UE) and base station may dynamically update a reference signal pattern, a symbol prefix configuration, or both based on channel propagation conditions such as a delay spread, multipath propagation, or frequency selectivity. In some cases, the UE may measure the channel propagation conditions and send an indication to the base station. The base station may then update the reference signal pattern or symbol prefix configuration accordingly, and send an indication of the new configuration to the UE. In some cases, i.e., for uplink communications, the base station may measure the channel propagation conditions directly, update the reference signal pattern or symbol prefix configuration, and then send a request to the UE to send subsequent reference signals or data communications based on the updated configuration. Updating a symbol prefix configuration may include updating a cyclic prefix configuration or a guard interval configuration.

A method of wireless communication is described. The method may include identifying one or more propagation channel measurement parameters including a delay spread parameter, a multipath fading parameter, or a frequency selectivity parameter, transmitting an indication of the one or more propagation channel measurement parameters to a base station, receiving a configuration message from the base station in response to transmitting the indication of the one or more propagation channel measurement parameters, and updating a reference signal pattern or a symbol prefix configuration based on the configuration message.

An apparatus for wireless communication is described. The apparatus may include means for identifying one or more propagation channel measurement parameters including a delay spread parameter, a multipath fading parameter, or a frequency selectivity parameter, means for transmitting an indication of the one or more propagation channel measurement parameters to a base station, means for receiving a configuration message from the base station in response to transmitting the indication of the one or more propagation channel measurement parameters, and means for updating a reference signal pattern or a symbol prefix configuration based on the configuration message.

Another apparatus for wireless communication is described. The apparatus may include a processor, memory in electronic communication with the processor, and instructions stored in the memory. The instructions may be operable to cause the processor to identify one or more propagation channel measurement parameters including a delay spread parameter, a multipath fading parameter, or a frequency selectivity parameter, transmit an indication of the one or more propagation channel measurement parameters to a base station, receive a configuration message from the base station in response to transmitting the indication of the one or more propagation channel measurement parameters, and update a reference signal pattern or a symbol prefix configuration based on the configuration message.

A non-transitory computer readable medium for wireless communication is described. The non-transitory computer-readable medium may include instructions operable to cause a processor to identify one or more propagation channel measurement parameters including a delay spread parameter, a multipath fading parameter, or a frequency selectivity parameter, transmit an indication of the one or more propagation channel measurement parameters to a base station, receive a configuration message from the base station in response to transmitting the indication of the one or more propagation channel measurement parameters, and update a reference signal pattern or a symbol prefix configuration based on the configuration message.

Some examples of the method, apparatus, and non-transitory computer-readable medium described above may further include processes, features, means, or instructions for receiving one or more reference signals based on the updated reference signal pattern.

In some examples of the method, apparatus, and non-transitory computer-readable medium described above, the reference signal pattern includes a pattern for a channel state information reference signal (CSI-RS), a cell specific reference signal (CRS), a demodulation reference signal (DMRS), a beamforming reference signal (BRS), a beamforming measurement reference signal (MRS), or a sounding reference signal (SRS).

Some examples of the method, apparatus, and non-transitory computer-readable medium described above may further include processes, features, means, or instructions for receiving a data communication from the base station based on the updated reference signal pattern or symbol prefix configuration.

In some examples of the method, apparatus, and non-transitory computer-readable medium described above, the symbol prefix configuration includes an orthogonal frequency division multiplexing (OFDM) cyclic prefix configuration, a single carrier frequency division multiplexing (SC-FDM) cyclic prefix configuration, or an SC-FDM guard interval configuration.

Some examples of the method, apparatus, and non-transitory computer-readable medium described above may further include processes, features, means, or instructions for receiving a broadcast system information message or a radio resource control (RRC) message, where the reference signal pattern or the symbol prefix configuration may be updated based on the broadcast system information message or the RRC message.

In some examples of the method, apparatus, and non-transitory computer-readable medium described above, the configuration message includes a physical downlink control (PDCCH) message. In some examples of the method, apparatus, and non-transitory computer-readable medium described above, the PDCCH message includes a common PDCCH message. In some examples of the method, apparatus, and non-transitory computer-readable medium described above, the PDCCH message includes an enhanced frequency or transmit power PDCCH message.

Some examples of the method, apparatus, and non-transitory computer-readable medium described above may further include processes, features, means, or instructions for identifying a coordinated multipoint (CoMP) configuration, a single-input multiple-output (SIMO) configuration, a multiple-input multiple-output (MIMO) configuration or additional downlink control information, where the reference signal pattern or the symbol prefix configuration may be updated based on the CoMP configuration, the SIMO configuration, the MIMO configuration, or the additional downlink control information.

In some examples of the method, apparatus, and non-transitory computer-readable medium described above, the indication may be transmitted based on a periodic reporting configuration. Some examples of the method, apparatus, and non-transitory computer-readable medium described above may further include processes, features, means, or instructions for receiving a request to transmit the indication of the one or more propagation channel measurement parameters from the base station, where the indication may be transmitted based on the request.

In some examples of the method, apparatus, and non-transitory computer-readable medium described above, the symbol prefix configuration includes a set of cyclic prefix durations associated with a set of symbol periods of a subframe or a plurality of symbol periods of a slot, or a combination thereof. In some examples of the method, apparatus, and non-transitory computer-readable medium described above, the configuration message includes a mapping between a subframe number and a cyclic prefix duration, or a mapping between a slot number and the cyclic prefix duration, and where the symbol prefix configuration may be updated based on the mapping and the subframe number or the mapping and the slot number.

In some examples of the method, apparatus, and non-transitory computer-readable medium described above, the SC-FDM guard interval configuration includes an indication of a number of zeroes to be appended or prepended to a data symbol prior to a discrete Fourier transform spreading. In some examples, the symbol prefix configuration may include the guard interval configuration. In some examples of the method, apparatus, and non-transitory computer-readable medium described above, the configuration message includes a combined indication of the reference signal pattern and the symbol prefix configuration.

A method of wireless communication is described. The method may include receiving an indication of one or more propagation channel measurement parameters from a UE, the one or more propagation channel measurement parameters including a delay spread parameter, a multipath fading parameter, or a frequency selectivity parameter, updating a reference signal pattern or a symbol prefix configuration based on the indication of the one or more propagation channel measurement parameters, and transmitting a configuration message to the UE in response to receiving the indication of the one or more propagation channel measurement parameters, the configuration message including an indication of the updated reference signal pattern or symbol prefix configuration.

An apparatus for wireless communication is described. The apparatus may include means for receiving an indication of one or more propagation channel measurement parameters from a UE, the one or more propagation channel measurement parameters including a delay spread parameter, a multipath fading parameter, or a frequency selectivity parameter, means for updating a reference signal pattern or a symbol prefix configuration based on the indication of the one or more propagation channel measurement parameters, and means for transmitting a configuration message to the UE in response to receiving the indication of the one or more propagation channel measurement parameters, the configuration message including an indication of the updated reference signal pattern or symbol prefix configuration.

Another apparatus for wireless communication is described. The apparatus may include a processor, memory in electronic communication with the processor, and instructions stored in the memory. The instructions may be operable to cause the processor to receive an indication of one or more propagation channel measurement parameters from a UE, the one or more propagation channel measurement parameters including a delay spread parameter, a multipath fading parameter, or a frequency selectivity parameter, update a reference signal pattern or a symbol prefix configuration based on the indication of the one or more propagation channel measurement parameters, and transmit a configuration message to the UE in response to receiving the indication of the one or more propagation channel measurement parameters, the configuration message including an indication of the updated reference signal pattern or symbol prefix configuration.

A non-transitory computer readable medium for wireless communication is described. The non-transitory computer-readable medium may include instructions operable to cause a processor to receive an indication of one or more propagation channel measurement parameters from a UE, the one or more propagation channel measurement parameters including a delay spread parameter, a multipath fading parameter, or a frequency selectivity parameter, update a reference signal pattern or a symbol prefix configuration based on the indication of the one or more propagation channel measurement parameters, and transmit a configuration message to the UE in response to receiving the indication of the one or more propagation channel measurement parameters, the configuration message including an indication of the updated reference signal pattern or symbol prefix configuration.

Some examples of the method, apparatus, and non-transitory computer-readable medium described above may further include processes, features, means, or instructions for transmitting one or more reference signals based on the updated reference signal pattern.

Some examples of the method, apparatus, and non-transitory computer-readable medium described above may further include processes, features, means, or instructions for transmitting a data communication to the UE based on the updated reference signal pattern or symbol prefix configuration.

Some examples of the method, apparatus, and non-transitory computer-readable medium described above may further include processes, features, means, or instructions for transmitting a broadcast system information message or a RRC message, where the reference signal pattern or the symbol prefix configuration may be updated based on the broadcast system information message or the RRC message.

In some examples of the method, apparatus, and non-transitory computer-readable medium described above, the configuration message includes a PDCCH message. In some examples of the method, apparatus, and non-transitory computer-readable medium described above, the PDCCH message includes a common PDCCH message. In some examples of the method, apparatus, and non-transitory computer-readable medium described above, the PDCCH message includes an enhanced frequency or receive power PDCCH message.

Some examples of the method, apparatus, and non-transitory computer-readable medium described above may further include processes, features, means, or instructions for transmitting an additional configuration message using a different beamforming direction, where the additional configuration message includes an indication of the updated reference signal pattern or symbol prefix configuration.

Some examples of the method, apparatus, and non-transitory computer-readable medium described above may further include processes, features, means, or instructions for identifying a CoMP configuration, a SIMO configuration, a MIMO configuration or additional downlink control information, where the reference signal pattern or the symbol prefix configuration may be updated based on the CoMP configuration, the SIMO configuration, the MIMO configuration, or the additional downlink control information.

Some examples of the method, apparatus, and non-transitory computer-readable medium described above may further include processes, features, means, or instructions for transmitting a request for the UE to transmit the indication of the one or more propagation channel measurement parameters, where the indication may be received based on the request.

A method of wireless communication is described. The method may include receiving a reference signal request from a base station based on one or more propagation channel measurement parameters, the one or more propagation channel measurement parameters including a delay spread parameter, a multipath fading parameter, or a frequency selectivity parameter, updating a reference signal pattern based on the reference signal request, and transmitting an uplink message to the base station based on the updated reference signal pattern.

An apparatus for wireless communication is described. The apparatus may include means for receiving a reference signal request from a base station based on one or more propagation channel measurement parameters, the one or more propagation channel measurement parameters including a delay spread parameter, a multipath fading parameter, or a frequency selectivity parameter, means for updating a reference signal pattern based on the reference signal request, and means for transmitting an uplink message to the base station based on the updated reference signal pattern.

Another apparatus for wireless communication is described. The apparatus may include a processor, memory in electronic communication with the processor, and instructions stored in the memory. The instructions may be operable to cause the processor to receive a reference signal request from a base station based on one or more propagation channel measurement parameters, the one or more propagation channel measurement parameters including a delay spread parameter, a multipath fading parameter, or a frequency selectivity parameter, update a reference signal pattern based on the reference signal request, and transmit an uplink message to the base station based on the updated reference signal pattern.

A non-transitory computer readable medium for wireless communication is described. The non-transitory computer-readable medium may include instructions operable to cause a processor to receive a reference signal request from a base station based on one or more propagation channel measurement parameters, the one or more propagation channel measurement parameters including a delay spread parameter, a multipath fading parameter, or a frequency selectivity parameter, update a reference signal pattern based on the reference signal request, and transmit an uplink message to the base station based on the updated reference signal pattern.

In some examples of the method, apparatus, and non-transitory computer-readable medium described above, the uplink message includes a SRS or a beamforming MRS.

A method of wireless communication is described. The method may include identifying one or more propagation channel measurement parameters including a delay spread parameter, a multipath fading parameter, or a frequency selectivity parameter, updating a reference signal pattern or a symbol prefix configuration based on the one or more propagation channel measurement parameters, transmitting a reference signal request to a UE, where the reference signal requests indicates the updated reference signal pattern or symbol prefix configuration, and receiving an uplink message from the UE in response to the reference signal request, where the uplink message is based on the reference signal pattern or the symbol prefix configuration.

An apparatus for wireless communication is described. The apparatus may include means for identifying one or more propagation channel measurement parameters including a delay spread parameter, a multipath fading parameter, or a frequency selectivity parameter, means for updating a reference signal pattern or a symbol prefix configuration based on the one or more propagation channel measurement parameters, means for transmitting a reference signal request to a UE, where the reference signal requests indicates the updated reference signal pattern or symbol prefix configuration, and means for receiving an uplink message from the UE in response to the reference signal request, where the uplink message is based on the reference signal pattern or the symbol prefix configuration.

Another apparatus for wireless communication is described. The apparatus may include a processor, memory in electronic communication with the processor, and instructions stored in the memory. The instructions may be operable to cause the processor to identify one or more propagation channel measurement parameters including a delay spread parameter, a multipath fading parameter, or a frequency selectivity parameter, update a reference signal pattern or a symbol prefix configuration based on the one or more propagation channel measurement parameters, transmit a reference signal request to a UE, where the reference signal requests indicates the updated reference signal pattern or symbol prefix configuration, and receive an uplink message from the UE in response to the reference signal request, where the uplink message is based on the reference signal pattern or the symbol prefix configuration.

A non-transitory computer readable medium for wireless communication is described. The non-transitory computer-readable medium may include instructions operable to cause a processor to identify one or more propagation channel measurement parameters including a delay spread parameter, a multipath fading parameter, or a frequency selectivity parameter, update a reference signal pattern or a symbol prefix configuration based on the one or more propagation channel measurement parameters, transmit a reference signal request to a UE, where the reference signal requests indicates the updated reference signal pattern or symbol prefix configuration, and receive an uplink message from the UE in response to the reference signal request, where the uplink message is based on the reference signal pattern or the symbol prefix configuration.

In some examples of the method, apparatus, and non-transitory computer-readable medium described above, the uplink message includes a SRS or a beamforming MRS. In some examples of the method, apparatus, and non-transitory computer-readable medium described above, the one or more propagation channel measurement parameters may be based on a channel reciprocity of a time division duplexing (TDD) configuration.

DETAILED DESCRIPTION

A user equipment (UE) and base station (e.g., UEs and base station operating in a wireless communication spectrum) may dynamically update a reference signal density, a cyclic prefix configuration, or both based on channel propagation conditions such as a delay spread, multipath propagation, or frequency selectivity, for example the wireless communication spectrum may be millimeter wave (mmW) spectrum, sub-6 GHz spectrum, among others. The UE and base station may use reference signals for channel quality estimation associated with different frequency ranges. That is, the reference signals may span a wide band of frequencies to enable estimation of frequency selective channels, where the channel may not have sufficient channel quality at some frequencies.

Thus, the UE or base station may determine a multipath delay spread based on the difference of a maximum and minimum delay of all the paths. The base station may semi-statically or dynamically adjust a reference signal configuration to enhance channel quality based on the delay spread, or the base station may configure the UE to adjust the reference signal configuration. The UE or base station may identify propagation channel measurement parameters and determine a reference signal configuration based on the parameters. For example, the configuration may include a reference signal density or pattern. Furthermore, channels experiencing multipath interference may have increased inter-symbol interference. Adjusting the cyclic prefix or a guard period to the duration of the delay spread may reduce the inter-symbol interference. A cyclic prefix and reference signal density or pattern may be configured jointly to reduce the signaling overhead if the configurations are correlated. For example, some reference signal configurations may implicitly specify the cyclic prefix configuration.

Aspects of the disclosure are initially described in the context of a wireless communications system. The wireless communication system may support for adapting to delay spread variation in wireless communication systems. Aspects of the disclosure are further illustrated by and described with reference to apparatus diagrams, system diagrams, and flowcharts that relate to adapting to delay spread variation in wireless communication systems. In some examples, wireless communication systems may be or include a mmW system.

Figure 1:
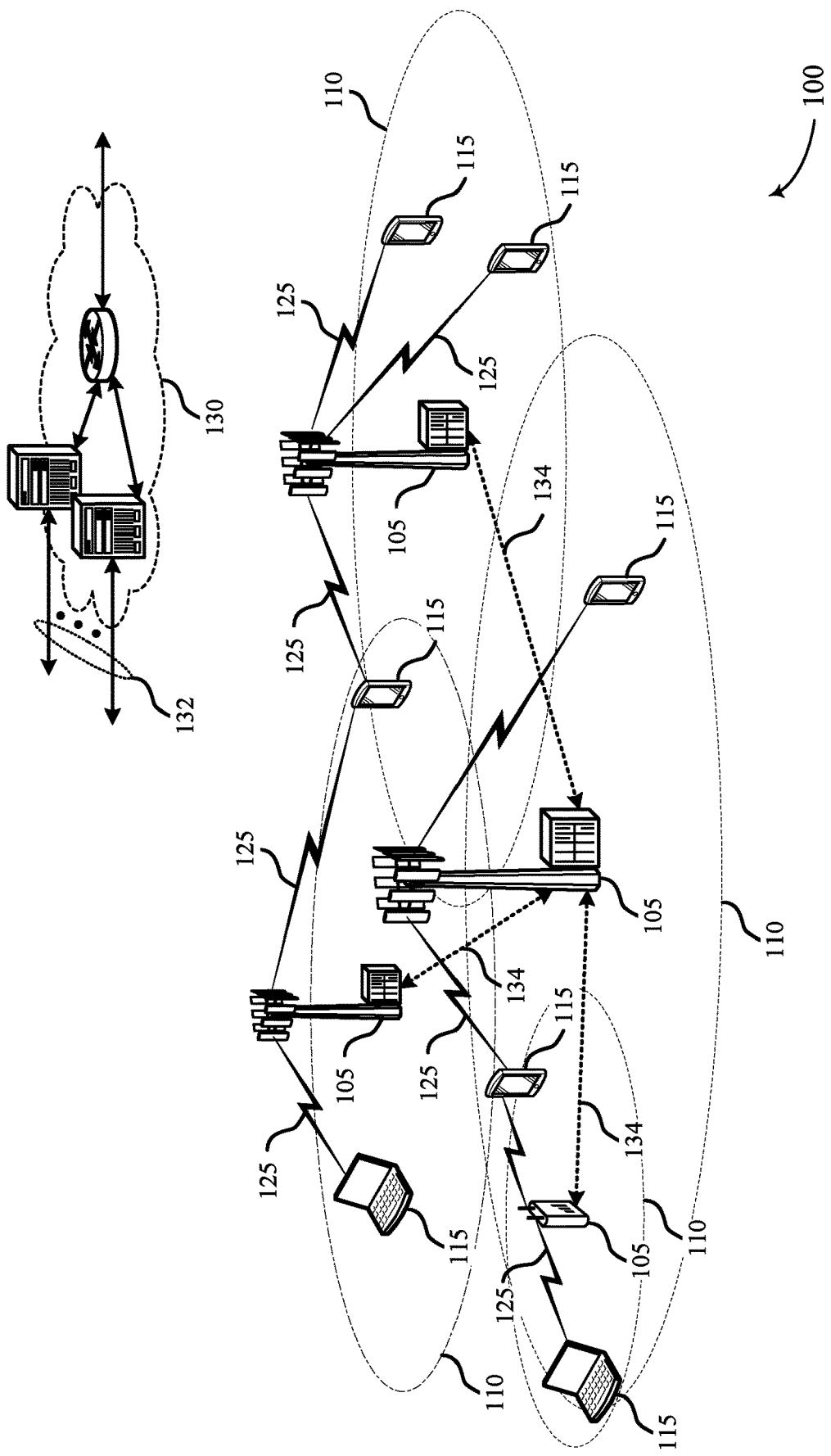
FIGS. 1 and 2 illustrate examples of systems for wireless communication that supports adapting to delay spread variation in wireless communication systems in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network.

Wireless communication system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support communications (e.g., such as communications using mmW spectrum, sub-6 GHz spectrum, etc.) between UEs 115 and base stations 105. Devices (e.g., UEs 115 and base station 105) operating in a wireless communication spectrum may have multiple antennas to allow beamforming. That is, a base station 105 may use multiple antennas or antenna arrays to conduct beamforming operations for directional communications with a UE 115. Beamforming (which may also be referred to as spatial filtering) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference. Multiple-input multiple-output (MIMO) wireless systems use a transmission scheme between a transmitter (e.g. a base station) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A receiving device (e.g., a UE 115) may try multiple beams (e.g., antenna subarrays) while receiving the synchronization signals.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an MTC device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, the antennas of a base station 105 or UE 115 may be located within one or more antenna arrays. One or more base station antennas or antenna arrays may be collocated at an antenna assembly, such as an antenna tower.

In some cases, antennas or antenna arrays associated with a base station 105 may be located in diverse geographic locations. A base station 105 may multiple use antennas or antenna arrays to conduct beamforming operations for directional communications with a UE 115.

A UE 115 or base station 105 may be configured for MIMO transmission. MIMO is a transmission scheme between a transmitter and a receiver both equipped with multiple antennas. A UE 115 may be configured to collaboratively communicate with multiple eNBs 105 through, for example, MIMO, Coordinated Multi-Point (CoMP), or other schemes. MIMO techniques use multiple antennas on the base stations 105 or multiple antennas on the UE 115 to take advantage of multipath environments to transmit multiple data streams. CoMP includes techniques for dynamic coordination of transmission and reception by a number of eNBs to improve overall transmission quality for UEs 115 as well as increasing network and spectrum utilization.

Multipath propagation is a radio condition caused by RF signals taking different paths from the transmitter to the receiver and subsequently interfering with each other. For example, it may be caused by different copies of a wireless signal reaching a receiver via different paths with varying path lengths. The different path lengths may be based on, for example, atmospheric reflection and refraction, or reflection from buildings, water, and other surfaces. Multipath propagation may result in a time delay (or a phase shift) for one copy of a signal, which cause constructive or destructive interference (between consecutive symbols, inter-symbol interference (ISI), or within a single symbol). A guard interval (GI) (which may include a cyclic prefix) may be prepended or appended to transmissions to enable mitigation of the effects of channel spreading caused by multipath propagation.

In some examples, time intervals may be expressed in multiples of a basic time unit (e.g., the sampling period, $T_s=1/30,720,000$ seconds). Time resources may be organized according to radio frames of length of 10 ms ($T_f=307200T_s$), which may be identified by an SFN ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). That is, a cyclic prefix may be appended to the beginning of each symbol to prevent inter-symbol interference.

In some examples, for some wave forms (such as single carrier frequency division multiplexing (SC-FDM) waveforms) a guard interval or zero tail consisting of one or more zeros prepended and/or appended to a data sequence may be used instead of or in addition to a cyclic prefix. Excluding the cyclic prefix, each symbol contains 2048 sample periods. In some cases the subframe may be the smallest scheduling unit of time, also known as a TTI. In other cases, a TTI may be shorter than a subframe or may be dynamically selected (e.g., in short TTI bursts or in selected component carriers using short TTIs). In some examples, the TTI may be a slot or a mini-slot.

A base station 105 may insert periodic pilot symbols such as a cell specific reference signal (CRS) to aid UEs 115 in channel estimation and coherent demodulation. CRS may include one of 504 different cell identities. They may be modulated using QPSK and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, a demodulation reference signal (DMRS) may be directed toward specific UEs 115 and may be transmitted on resource blocks assigned to those UEs 115. DMRS may include signals on 6 resource elements in each resource block in which they are transmitted. The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as channel state information reference signals (CSI-RS) may be included to aid in generating CSI. On the uplink (UL), a UE 115 may transmit a combination of periodic sounding reference signal (SRS) and UL DMRS for link adaptation and demodulation, respectively. In some cases, the reference signal density or pattern may depend on channel conditions such as frequency selectivity, multipath propagation, or delay spread.

Thus, a UE 115 and base station 105 may dynamically update a reference signal pattern, a symbol prefix configuration, or both based on channel propagation conditions such as a delay spread, multipath propagation, or frequency selectivity. In some cases, the UE 115 may measure the channel propagation conditions and send an indication to the base station 105. The base station 105 may then update the reference signal pattern or symbol prefix configuration accordingly, and send an indication of the new configuration to the UE 115. In some examples, the symbol prefix configuration may include a guard interval configuration. In some cases, i.e., for uplink communications, the base station 105 may measure the channel propagation conditions directly, update the reference signal pattern or symbol prefix configuration, and then send a request to the UE 115 to send subsequent reference signals or data communications based on the updated configuration.

Figure 2:
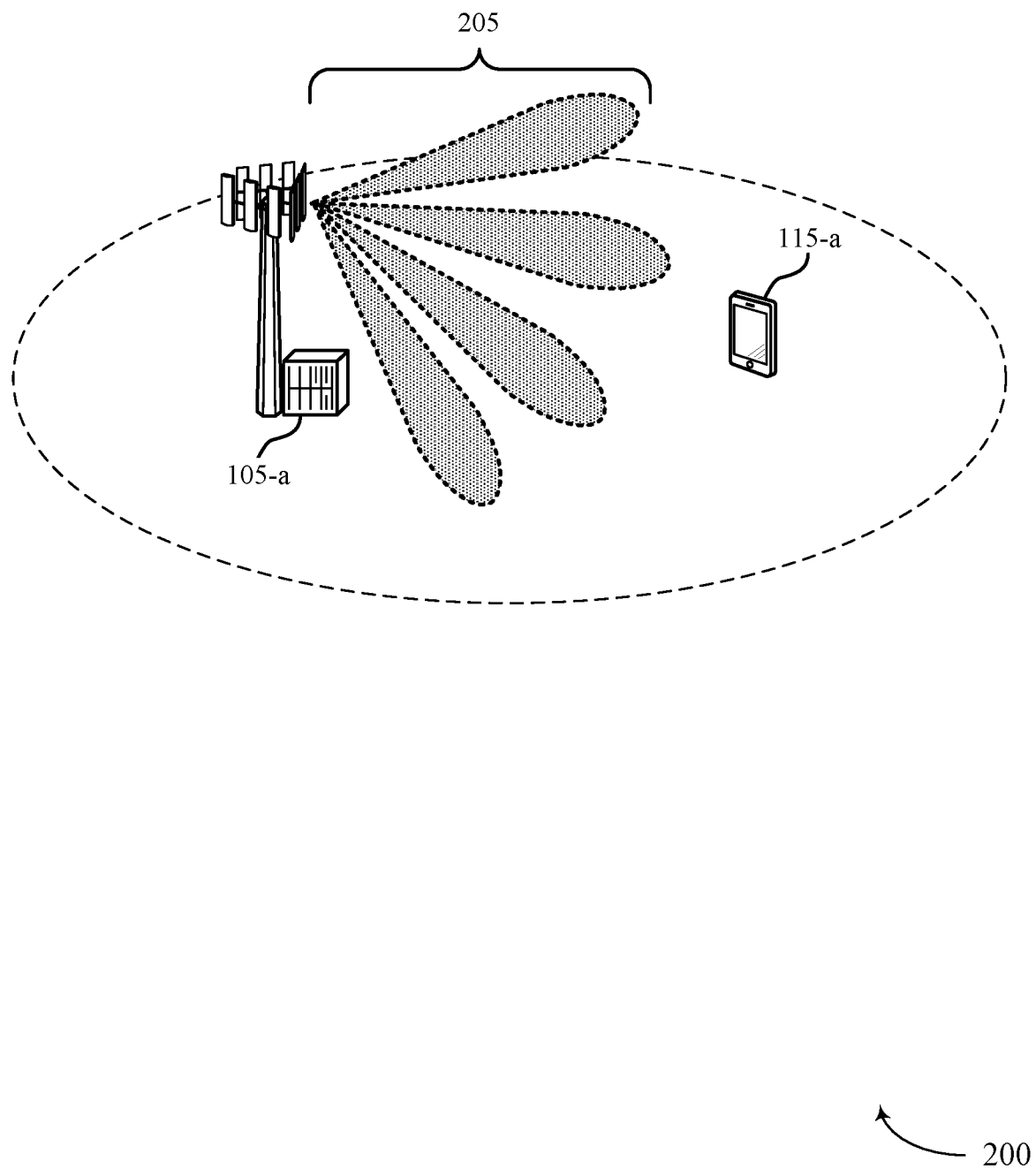

FIG. 2 illustrates an example of a wireless communication system 200 that supports adapting to delay spread variation in wireless communication systems. In some cases, wireless communication system 200 may represent aspects of techniques performed by a UE 115 or base station 105 as described with reference to FIG. 1. The wireless communication system 200 may include UE 115-a and base station 105-a, which may respectively be examples of a UE 115 and a base station 105 of FIG. 1.

UE 115-a and base station 105-a may set a reference signal density and symbol prefix configuration based on channel conditions. UE 115-a and base station 105-a may use reference signals for channel quality estimation. In some examples, UE 115-a and base station 105-a may communicate using an orthogonal frequency division multiplexing (OFDM) waveform. The reference signals may span a wide band of frequencies to enable estimation of frequency selective channels, where the channel may not have sufficient channel quality at some frequencies. UE 115-a or base station 105-a may determine a multipath delay spread based on the difference of a maximum and minimum delay of all the paths. Base station 105-a may semi-statically or dynamically adjust a reference signal configuration to enhance channel quality based on the delay spread, or base station 105-a may configure UE 115-a to adjust the reference signal configuration. Furthermore, channels experiencing multipath interference may have increased inter-symbol interference. Adjusting the cyclic prefix or guard period to the duration of the delay spread may reduce the inter-symbol interference. However, changing the cyclic prefix may change the overall symbol duration or number of symbols in the slot or subframe, which may affect the slot or subframe timing.

A reference signal density of a channel may be adjustable based on channel conditions. For example, a channel used for millimeter wave communication may use an adjustable reference signal configuration. The channel may be frequency selective due to multipath interference in the channel, and the channel may not have sufficient channel quality at some frequencies. The frequency selectivity of the channel may be based on a multipath delay spread, which may be determined based on the difference of a maximum and minimum delay of all paths. The frequency selectivity may also be based on the channel's impulse response (e.g., the full set of path delays, gains and phases). Therefore, the frequency selectivity of the channel may not be directly proportional with the multipath delay. However, a low delay spread (e.g., a single path channel) may translate to a low frequency selectivity, which may enable a reference signal to be placed more sparsely in frequency and reduce a reference signal overhead. The correlation of low delay spread to low frequency selectivity may be appropriate for determining a pattern (e.g., placement) of channel estimation for data demodulation (e.g., DMRS or reference signals used for noise compensation) as well as those used for CQI (e.g., CSI-RS) and beam-related measurements.

A reference signal configuration may be dynamically or semi-statically determined based on propagation channel measurement parameters. Propagation channel measurement parameters may include CSI-RS density and a DMRS pattern. A set of possible values of the propagation channel measurement parameters may be defined, and the parameters used for a slot or subframe may be selected based on information in a scheduling grant. In one example, the information may be a set of bits reserved for indicating the desired set of propagation channel measurement parameters or an indirect indication based on other parameters of the grant or broadcast system information (e.g., system information blocks (SIBs) or radio resource control (RRC) messages). In another example, a DMRS pattern may depend on whether single-input, multiple-output (SIMO) or MIMO transmissions are used, which may be based on the scheduling grant. The DMRS pattern may also be based on an explicit indication via reserved bits in the scheduling grant.

UE 115-a may report propagation channel measurement parameters to base station 105-a. UE 115-a may periodically report information such as delay-spread, a number of multipaths, an observed frequency selectivity (e.g., based on reference signal measurements) to base station 105-a to help base station 105-a determine preferred settings of the propagation channel measurement parameters for UE 115-a. Base station 105-a may then transmit a configuration message to UE 115-a in response to the parameters. In other examples, UE 115-a may also directly request a particular set of propagation channel measurement parameters. Base station 105-a may decide propagation channel measurement parameters based on the reports from UE 115-a or based on uplink channel measurements made at base station 105-a. The measurements may be based on channel reciprocity for TDD systems. For a requested reference signal, propagation channel measurement parameters may be included in a request to transmit the reference signal. For example, for uplink sounding reference signal transmissions made by UE 115-a in response to a request from base station 105-a, the SRS density may be included in the request. Similarly, if UE 115-*a* requests a mobile relay station training, the measurement reference signal (MRS) density may be included in the request Base station 105-*a* may adjust a cyclic prefix or guard period based on a delay spread. Adjusting the cyclic prefix or guard period may reduce the inter-symbol interference. The cyclic prefix for an OFDM based waveform may be used for frequency-domain equalization of multipath channels. The cyclic prefix may be at least as long the channel delay spread to avoid causing inter-symbol interference. However, changing the cyclic prefix may change the overall OFDM symbol period duration, which may alter the slot or subframe timing. Multiple cyclic prefix durations may be predefined, and each predefined duration may align with a slot or subframe by changing a number of OFDM symbols in the slot or subframe.

The adjusted cyclic prefix or guard period duration for a slot or subframe may be indicated in control signaling at the beginning of the slot or subframe. OFDM symbols in the beginning of the slot or subframe may carry control information (e.g., PDCCH) and may indicate which cyclic prefix configuration to use for the rest of the slot or subframe. The slot or subframe may have a fixed cyclic prefix length. If the slot or subframe has a variable cyclic prefix length, a more complex multiple cyclic prefix hypothesis blind decoding of the control information may be used to determine the cyclic prefix. Since all UEs 115 using resources in the slot or subframe use the same cyclic prefix configuration, a broadcast message may be used in the initial OFDM symbols. In some examples, the broadcast message may be read by all UEs 115 instead of signaling the same information in every control channel grant. In wireless systems using millimeter wave transmission, because beamforming is used to reach the cell edge, the broadcast may be scheduled to ensure that all UEs 115 receiving the same slot or subframe receive it based on a similar transmit beam direction from base station 105-*a*. In other examples, a broadcast message may also be allocated additional frequency and power resources.

Symbol prefix configurations may be mapped to a slot or subframe number. Base station 105-*a* may schedule UE 115-*a* based on an estimated cyclic prefix length requirement of UE 115-*a*. This may avoid dynamically signaling the cyclic prefix, but may result in increased scheduling complexity and reduced flexibility in scheduling. The flexibility reduction may be mitigated by semi-statically adapting the slot or subframe to cyclic prefix configuration mapping (e.g., configuring more slots or subframes for a shorter cyclic prefix if users have low delay spreads). For a zero tailed or guard interval based SC-FDM waveform, a guard period, prior to discrete Fourier transform (DFT) spreading or in an inverse fast Fourier transform (IFFT) duration, may be used instead of a cyclic prefix. Changing the length of the guard interval may not change the SC-FDM symbol size. Therefore, using the guard interval may allow for a more continuous adaptation of the guard interval length without additional configuration to align to a slot duration or subframe duration for each for each choice of guard interval. A broadcasting configuration or a mapping configuration, similar to configurations used for a cyclic prefix, may also be used for a guard period. Furthermore, different UEs 115 using resources within a common slot or subframe may have different guard interval lengths. In some examples, an SC-FDM waveform may be referred to as a DFT-spread OFDM waveform or DFT-precoded OFDM waveform.

Symbol prefix and reference signal density may be configured jointly to reduce the signaling overhead if the configurations are correlated. For example, if a symbol prefix configuration (e.g., for a cyclic prefix or a guard interval) is signaled in PDCCH, then joint signaling of the configuration with a propagation channel measurement parameter may reduce signaling overhead. For example, low delay spreads may be associated with a low cyclic prefix and low reference signal density, so the signaling may not have provision for all combinations of cyclic prefix (e.g., high/low) and reference signal density (e.g., low/high). If the wireless system uses propagation channel measurement parameters, some transmission modes may implicitly specify the symbol prefix configuration. For example, if UE 115-*a* receives data simultaneously from multiple base stations 105 (e.g., for downlink CoMP transmission), there may be a higher chance of a higher delay spread. Therefore, a higher cyclic prefix configuration may be implicitly determined instead of signaling the cyclic prefix separately.

Figure 3:
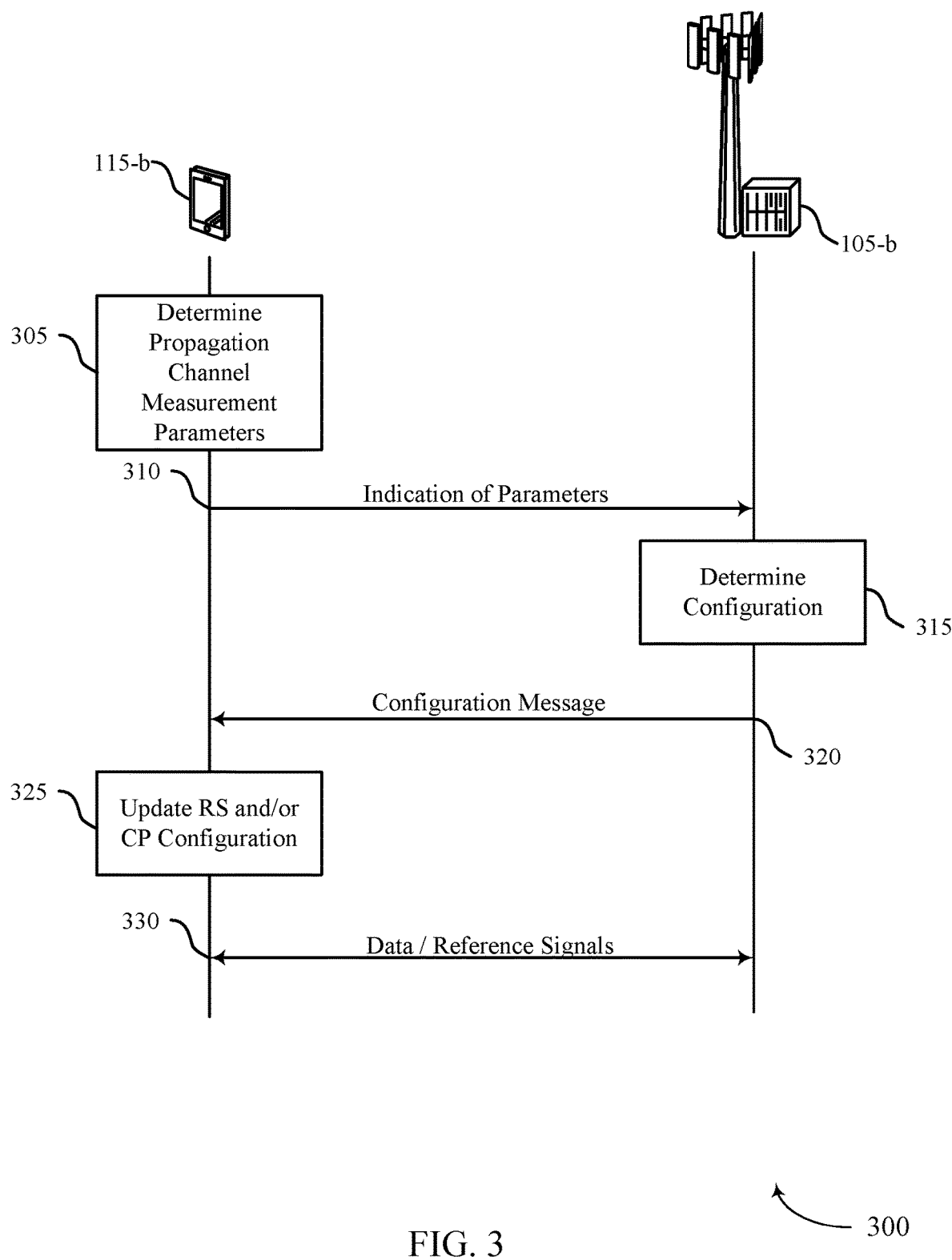
FIGS. 3 and 4 illustrate examples of process flows that supports adapting to delay spread variation in wireless communication systems in accordance with aspects of the present disclosure.

FIG. 3 illustrates an example of a process flow 300 for adapting to delay spread variation in wireless communication systems. Process flow 300 may include UE 115-*b* and base station 105-*b*, which may be respective examples of a UE 115 and base station 105 as described herein with reference to FIGS. 1-2. Process flow 300 may be an example of a downlink adaptation to delay spread variation in wireless communication systems. In some examples, wireless communication systems may be or include a mmW system.

At step 305, UE 115-*b* may determine propagation channel measurement parameters. UE 115-*b* may monitor downlink transmission to determine the parameters. The parameters may include a delay spread parameter, a multipath fading parameter, and a frequency selectivity parameter.

At step 310, UE 115-*b* may transmit an indication of one or more of the parameters to base station 105-*b*. The indication may be transmitted based on a period reporting configuration.

At step 315, base station 105-*b* may determine a configuration for wireless communication. For example, the configuration may relate to a reference signal pattern or a symbol prefix configuration. The reference signal pattern may include a pattern for a CSI-RS, a CRS, a DMRS, a beamforming reference signal (BRS), an MRS, or an RS. The symbol prefix configuration may include an OFDM cyclic prefix configuration, an SC-FDM cyclic prefix configuration, or an SC-FDM guard interval configuration. The symbol prefix configuration may also include multiple cyclic prefix durations associated with multiple symbol periods of a slot or subframe.

At step 320, base station 105-*b* may transmit a configuration message to UE 115-*b*. The configuration message may be transmitted in response to UE 115-*b* transmitting the propagation channel measurement parameters and may include the symbol prefix configuration or reference signal pattern determined in step 315. The configuration message may include a mapping between a slot number or subframe number and a cyclic prefix duration, where the symbol prefix configuration is updated based on the mapping. In some examples, the configuration may not itself include the mapping, but the mapping may be configured by an RRC message and the slot number or subframe number of the configuration message. The configuration message may include a combination indication of the reference signal pattern and the symbol prefix configuration.

At step 325, UE 115-*b* may update a reference symbol configuration or symbol prefix configuration. UE 115-*b* may update the reference signal pattern or symbol prefix configuration based on the configuration message. At step 330, UE 115-*b* and base station 105-*b* may communicate using the updated reference symbol configuration or symbol prefix configuration.

Figure 4:
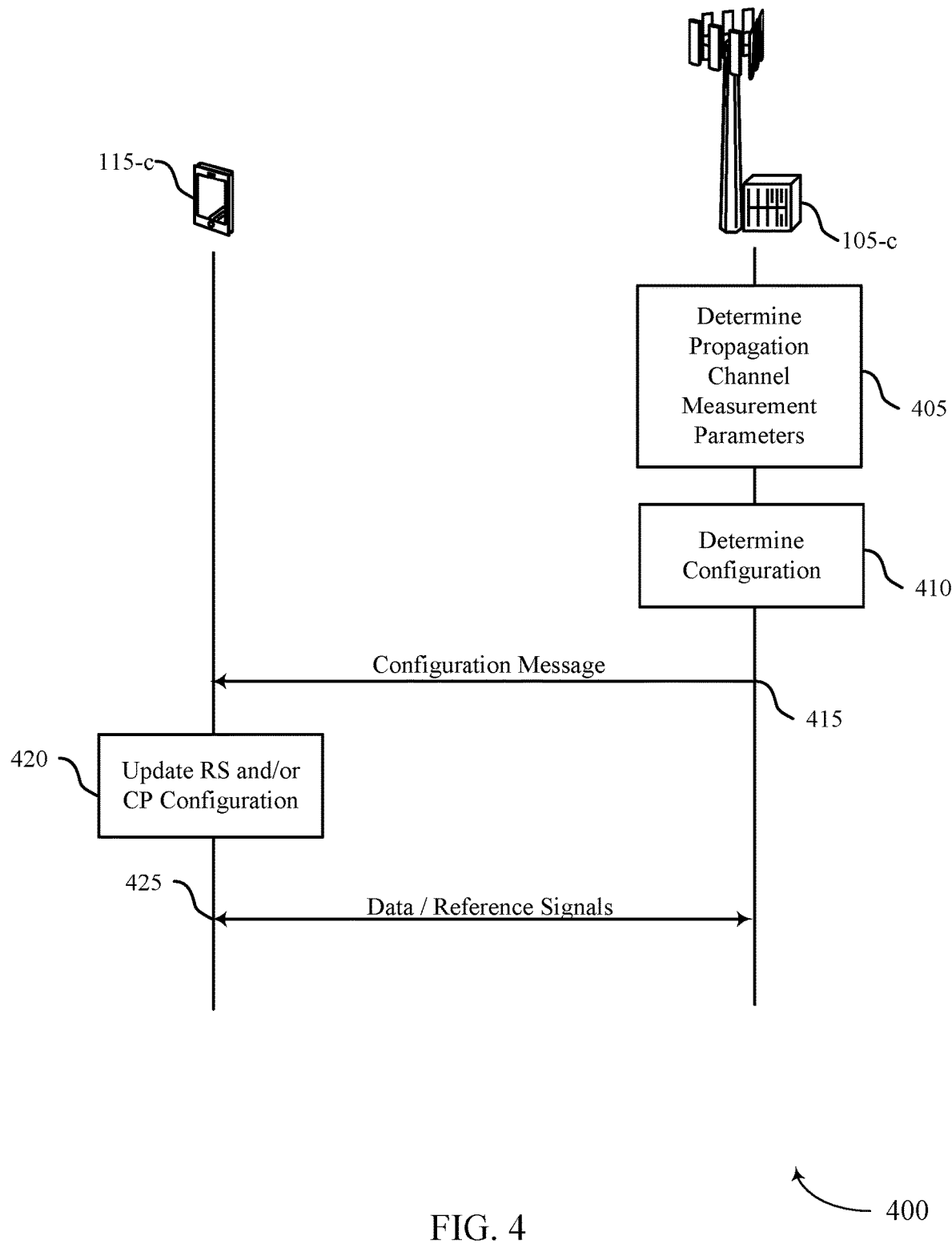

FIG. 4 illustrates an example of a process flow 400 for adapting to delay spread variation in wireless communication systems. Process flow 300 may include UE 115-*c* and base station 105-*c*, which may be respective examples of a UE 115 and base station 105 as described herein with reference to FIGS. 1-3. Process flow 300 may be an example of an uplink adaptation to delay spread variation in wireless communication systems. In some examples, wireless communication systems may be or include a mmW system.

At step 405, base station 105-*c* may determine propagation channel measurement parameters. The propagation channel measurement parameters may include a delay spread parameter, a multipath fading parameter, or a frequency selectivity parameter.

At step 410, base station 105-*c* may determine an updated configuration for a reference signal pattern or symbol prefix configuration. Base station 105-*c* may update the reference signal pattern or symbol prefix configuration based on the propagation channel measurement parameters. The reference signal pattern may include a pattern for a CSI-RS, a CRS, a DMRS, a BRS, an MRS, or an RS. The symbol prefix configuration may include an OFDM cyclic prefix configuration, an SC-FDM cyclic prefix configuration, or an SC-FDM guard interval configuration. The symbol prefix configuration may also include multiple cyclic prefix durations associated with multiple symbol periods of a slot or subframe.

At step 415, base station 105-*c* may transmit a configuration message to UE 115-*c*. The configuration message may include the symbol prefix configuration or reference signal pattern determined in step 410. The configuration message may include a mapping between a subframe number and a cyclic prefix duration, or a mapping between a slot number and the cyclic prefix duration, where the symbol prefix configuration is updated based on the mapping and the subframe number or the mapping and the slot number. The configuration message may include a combination indication of the reference signal pattern and the symbol prefix configuration.

At step 420, UE 115-*c* may update a reference symbol configuration or symbol prefix configuration. UE 115-*c* may update the reference signal pattern or symbol prefix configuration based on the configuration message. At step 425, UE 115-*c* and base station 105-*c* may communicate using the updated reference symbol configuration or symbol prefix configuration.

Figure 5:
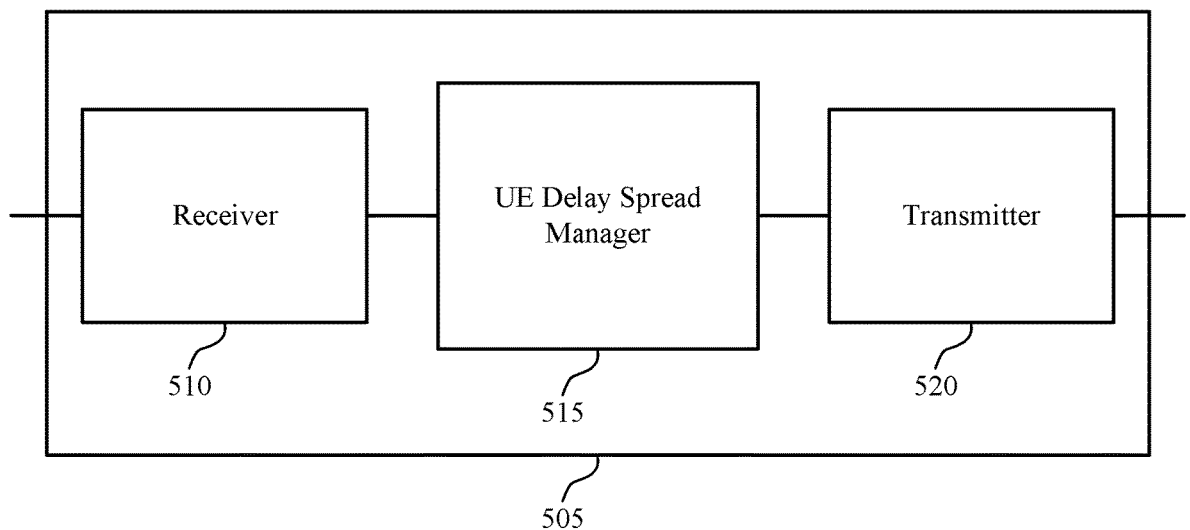
FIGS. 5 through 7 show block diagrams of a device that supports adapting to delay spread variation in wireless communication systems in accordance with aspects of the present disclosure.

FIG. 5 shows a block diagram 500 of a device 505 that supports adapting to delay spread variation in wireless communication systems in accordance with various aspects of the present disclosure. Device 505 may be an example of aspects of a UE 115 as described with reference to FIG. 1. Device 505 may include receiver 510, UE delay spread manager 515, and transmitter 520. Device 505 may also include a processor. Each of these components may be in communication with one another (e.g., via one or more buses). In some examples, wireless communication systems may be or include a mmW system.

Receiver 510 may receive information such as packets, user data, or control information associated with various information channels (e.g., control channels, data channels, and information related to adapting to delay spread variation in wireless communication systems, etc.). Information may be passed on to other components of the device. The receiver 510 may be an example of aspects of the transceiver 835 described with reference to FIG. 8. For example, receiver 510 may receive a data communication from a base station 105 based on an updated reference signal pattern or symbol prefix configuration.

UE delay spread manager 515 may be an example of aspects of the UE delay spread manager 815 described with reference to FIG. 8. UE delay spread manager 515 may identify one or more propagation channel measurement parameters including a delay spread parameter, a multipath fading parameter, or a frequency selectivity parameter, transmit an indication of the one or more propagation channel measurement parameters to a base station 105, receive a configuration message from the base station 105 in response to transmitting the indication of the one or more propagation channel measurement parameters, and update a reference signal pattern or a symbol prefix configuration based on the configuration message.

UE delay spread manager 515 may also receive a reference signal request from a base station 105 based on one or more propagation channel measurement parameters, the one or more propagation channel measurement parameters including a delay spread parameter, a multipath fading parameter, or a frequency selectivity parameter and update a reference signal pattern or a symbol prefix configuration based on the reference signal request.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas. For example, transmitter 520 may transmit an uplink message to the base station 105 based on the updated reference signal pattern or symbol prefix configuration. In some cases, the uplink message includes a SRS or a beamforming MRS.

Figure 6:
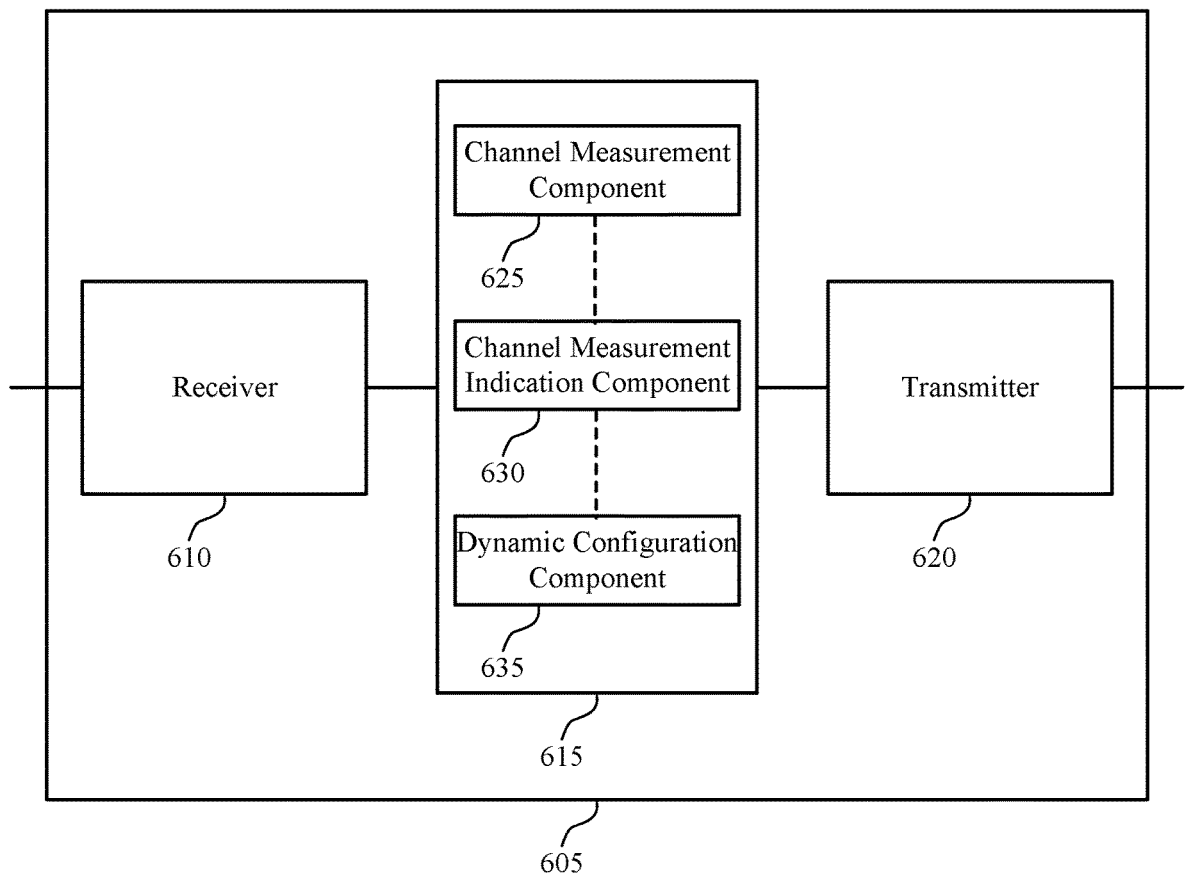

FIG. 6 shows a block diagram 600 of a device 605 that supports adapting to delay spread variation in wireless communication systems in accordance with various aspects of the present disclosure. Device 605 may be an example of aspects of a device 505 or a UE 115 as described with reference to FIGS. 1 and 5. Device 605 may include receiver 610, UE delay spread manager 615, and transmitter 620. Device 605 may also include a processor. Each of these components may be in communication with one another (e.g., via one or more buses). In some examples, wireless communication systems may be or include a mmW system.

Receiver 610 may receive information such as packets, user data, or control information associated with various information channels (e.g., control channels, data channels, and information related to adapting to delay spread variation in wireless communication systems, etc.). Information may be passed on to other components of the device. The receiver 610 may be an example of aspects of the transceiver 835 described with reference to FIG. 8.

UE delay spread manager 615 may be an example of aspects of the UE delay spread manager 815 described with reference to FIG. 8. UE delay spread manager 615 may also include channel measurement component 625, channel measurement indication component 630, and dynamic configuration component 635.

Channel measurement component 625 may identify one or more propagation channel measurement parameters including a delay spread parameter, a multipath fading parameter, or a frequency selectivity parameter. Channel measurement indication component 630 may transmit an indication of the one or more propagation channel measurement parameters to a base station 105. In some cases, the indication is transmitted based on a periodic reporting configuration.

Dynamic configuration component 635 may receive a configuration message from the base station 105 in response to transmitting the indication of the one or more propagation channel measurement parameters, update a reference signal pattern or a symbol prefix configuration based on the configuration message, receive a reference signal request from the base station 105 based on one or more propagation channel measurement parameters, the one or more propagation channel measurement parameters including a delay spread parameter, a multipath fading parameter, or a frequency selectivity parameter, update a reference signal pattern or a symbol prefix configuration based on the reference signal request, and identify a CoMP configuration, a single-input multiple-output SIMO configuration, a MIMO configuration or additional downlink control information, where the reference signal pattern or the symbol prefix configuration is updated based on the CoMP configuration, the SIMO configuration, the MIMO configuration, or the additional downlink control information.

In some cases, the configuration message includes a PDCCH message. In some cases, the PDCCH message includes a common PDCCH message. In some cases, the PDCCH message includes an enhanced frequency or transmit power PDCCH message. In some cases, the symbol prefix configuration includes a set of cyclic prefix durations associated with a set of symbol periods of a subframe, or a set of symbol periods of a slot, or a combination thereof. In some cases, the configuration message includes a mapping between a subframe number and a cyclic prefix duration, or a mapping between a slot number and the cyclic prefix duration, and where the symbol prefix configuration is updated based on the mapping and the subframe number or the mapping and the slot number.

In some cases, the SC-FDM guard interval configuration includes an indication of a number of zeroes to be appended or prepended to a data symbol within an IFFT interval or prior to DFT spreading. In some cases, the configuration message includes a combined indication of the reference signal pattern and the symbol prefix configuration. In some cases, the symbol prefix configuration includes an OFDM cyclic prefix configuration, an SC-FDM cyclic prefix configuration, or an SC-FDM guard interval configuration.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
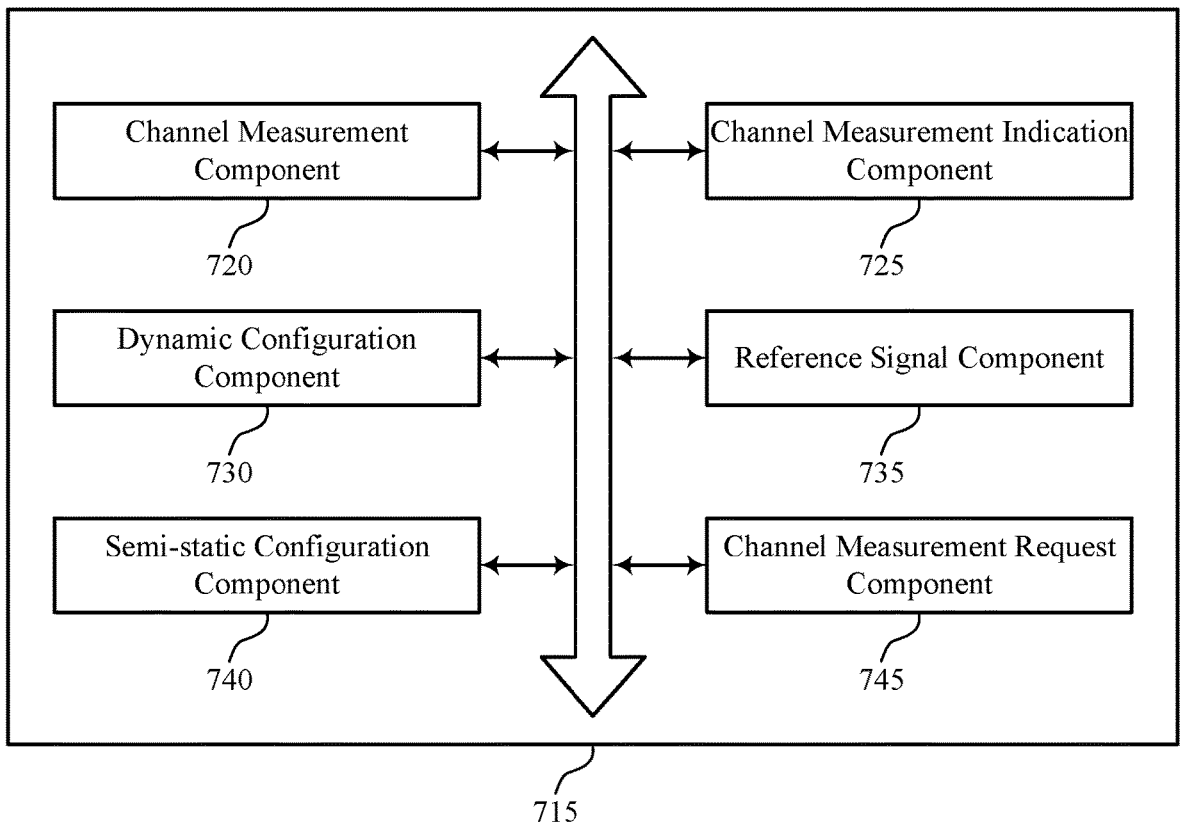

FIG. 7 shows a block diagram 700 of a UE delay spread manager 715 that supports adapting to delay spread variation in wireless communication systems in accordance with various aspects of the present disclosure. The UE delay spread manager 715 may be an example of aspects of a UE delay spread manager 515, a UE delay spread manager 615, or a UE delay spread manager 815 described with reference to FIGS. 5, 6, and 8. The UE delay spread manager 715 may include channel measurement component 720, channel measurement indication component 725, dynamic configuration component 730, reference signal component 735, semi-static configuration component 740, and channel measurement request component 745. Each of these modules may communicate, directly or indirectly, with one another (e.g., via one or more buses). In some examples, wireless communication systems may be or include a mmW system.

Channel measurement component 720 may identify one or more propagation channel measurement parameters including a delay spread parameter, a multipath fading parameter, or a frequency selectivity parameter. Channel measurement indication component 725 may transmit an indication of the one or more propagation channel measurement parameters to a base station 105. In some cases, the indication is transmitted based on a periodic reporting configuration.

Dynamic configuration component 730 may receive a configuration message from the base station 105 in response to transmitting the indication of the one or more propagation channel measurement parameters, update a reference signal pattern or a symbol prefix configuration based on the configuration message, receive a reference signal request from the base station 105 based on one or more propagation channel measurement parameters, the one or more propagation channel measurement parameters including a delay spread parameter, a multipath fading parameter, or a frequency selectivity parameter, update a reference signal pattern or a symbol prefix configuration based on the reference signal request, and identify a CoMP configuration, a SIMO configuration, a MIMO configuration or additional downlink control information.

Reference signal component 735 may receive one or more reference signals based on the updated reference signal pattern. In some cases, the reference signal pattern includes a pattern for a CSI-RS, a CRS, a DMRS, a BRS, a beamforming MRS, or a SRS.

Semi-static configuration component 740 may receive a broadcast system information message or a radio resource control (RRC) message, where the reference signal pattern or the symbol prefix configuration are updated based on the broadcast system information message or the RRC message. The reference signal pattern or the symbol prefix configuration may be updated based on a mapping between the reference signal pattern or symbol prefix configuration and a subframe number or a mapping between a slot number and the cyclic prefix duration. In some cases, the mapping may be previously configured by the RRC message.

Channel measurement request component 745 may receive a request to transmit the indication of the one or more propagation channel measurement parameters from the base station 105, where the indication is transmitted based on the request.

Figure 8:
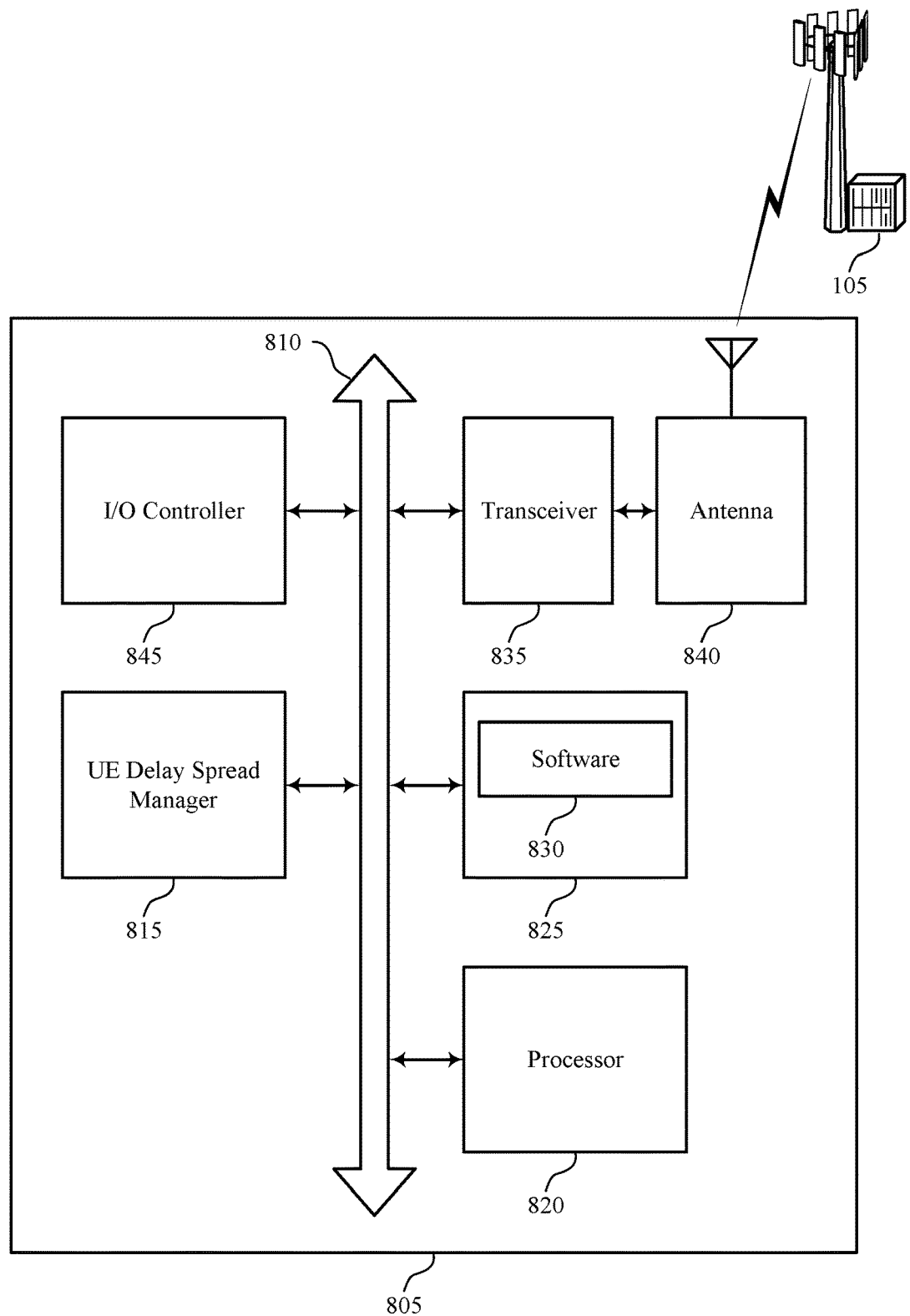
FIG. 8 illustrates a block diagram of a system including a user equipment (UE) that supports adapting to delay spread variation in wireless communication systems in accordance with aspects of the present disclosure.

FIG. 8 shows a diagram of a system 800 including a device 805 that supports adapting to delay spread variation in wireless communication systems in accordance with various aspects of the present disclosure. Device 805 may be an example of or include the components of device 505, device 605, or a UE 115 as described above, e.g., with reference to FIGS. 1, 5 and 6. Device 805 may include components for bi-directional voice and data communications including components for transmitting and receiving communications, including UE delay spread manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105. In some examples, wireless communication systems may be or include a mmW system.

Processor 820 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting adapting to delay spread variation in wireless communication systems).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support adapting to delay spread variation in wireless communication systems. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
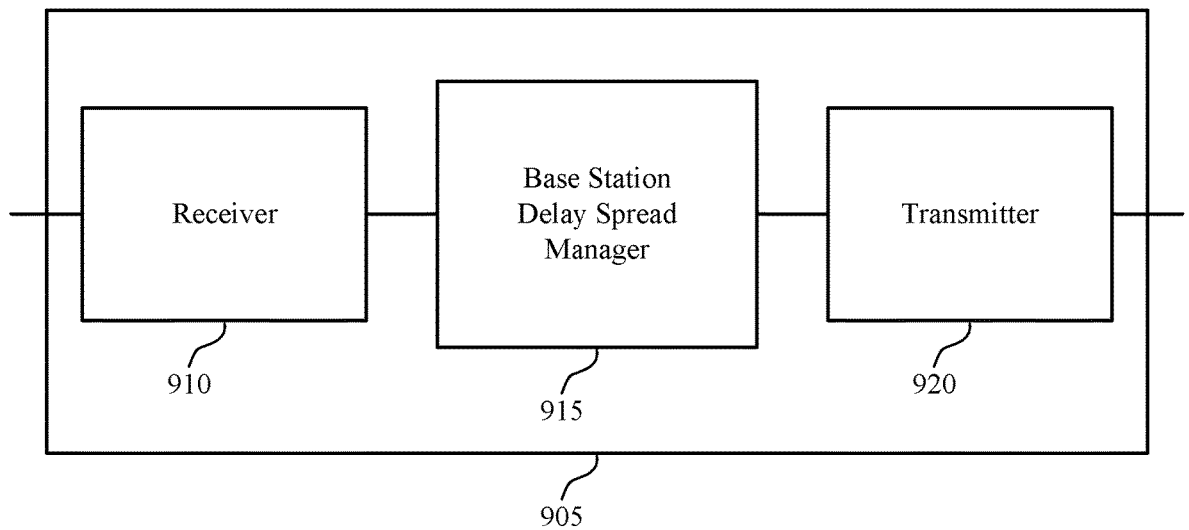
FIGS. 9 through 11 show block diagrams of a device that supports adapting to delay spread variation in wireless communication systems in accordance with aspects of the present disclosure.

FIG. 9 shows a block diagram 900 of a device 905 that supports adapting to delay spread variation in wireless communication systems in accordance with various aspects of the present disclosure. Device 905 may be an example of aspects of a base station 105 as described with reference to FIG. 1. Device 905 may include receiver 910, base station delay spread manager 915, and transmitter 920. Device 905 may also include a processor. Each of these components may be in communication with one another (e.g., via one or more buses). In some examples, wireless communication systems may be or include a mmW system.

Receiver 910 may receive information such as packets, user data, or control information associated with various information channels (e.g., control channels, data channels, and information related to adapting to delay spread variation in wireless communication systems, etc.). Information may be passed on to other components of the device. The receiver 910 may be an example of aspects of the transceiver 1235 described with reference to FIG. 12. For example, receiver 910 may receive an uplink message from a UE 115 based on the updated reference signal pattern or symbol prefix configuration. In some cases, the uplink message includes a SRS or a beamforming measurement reference signal (MRS).

Base station delay spread manager 915 may be an example of aspects of the base station delay spread manager 1215 described with reference to FIG. 12. Base station delay spread manager 915 may receive an indication of one or more propagation channel measurement parameters from the UE 115, the one or more propagation channel measurement parameters including a delay spread parameter, a multipath fading parameter, or a frequency selectivity parameter, update a reference signal pattern or a symbol prefix configuration based on the indication of the one or more propagation channel measurement parameters, and transmit a configuration message to the UE 115 in response to receiving the indication of the one or more propagation channel measurement parameters, the configuration message including an indication of the updated reference signal pattern or symbol prefix configuration.

Base station delay spread manager 915 may also identify one or more propagation channel measurement parameters including a delay spread parameter, a multipath fading parameter, or a frequency selectivity parameter, update a reference signal pattern or a symbol prefix configuration based on the one or more propagation channel measurement parameters, and transmit a reference signal request to a UE 115 based on one or more propagation channel measurement parameters, the one or more propagation channel measurement parameters including a delay spread parameter, a multipath fading parameter, or a frequency selectivity parameter.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas. For example, transmitter 920 may transmit a data communication to the UE 115 based on the updated reference signal pattern or symbol prefix configuration.

Figure 10:
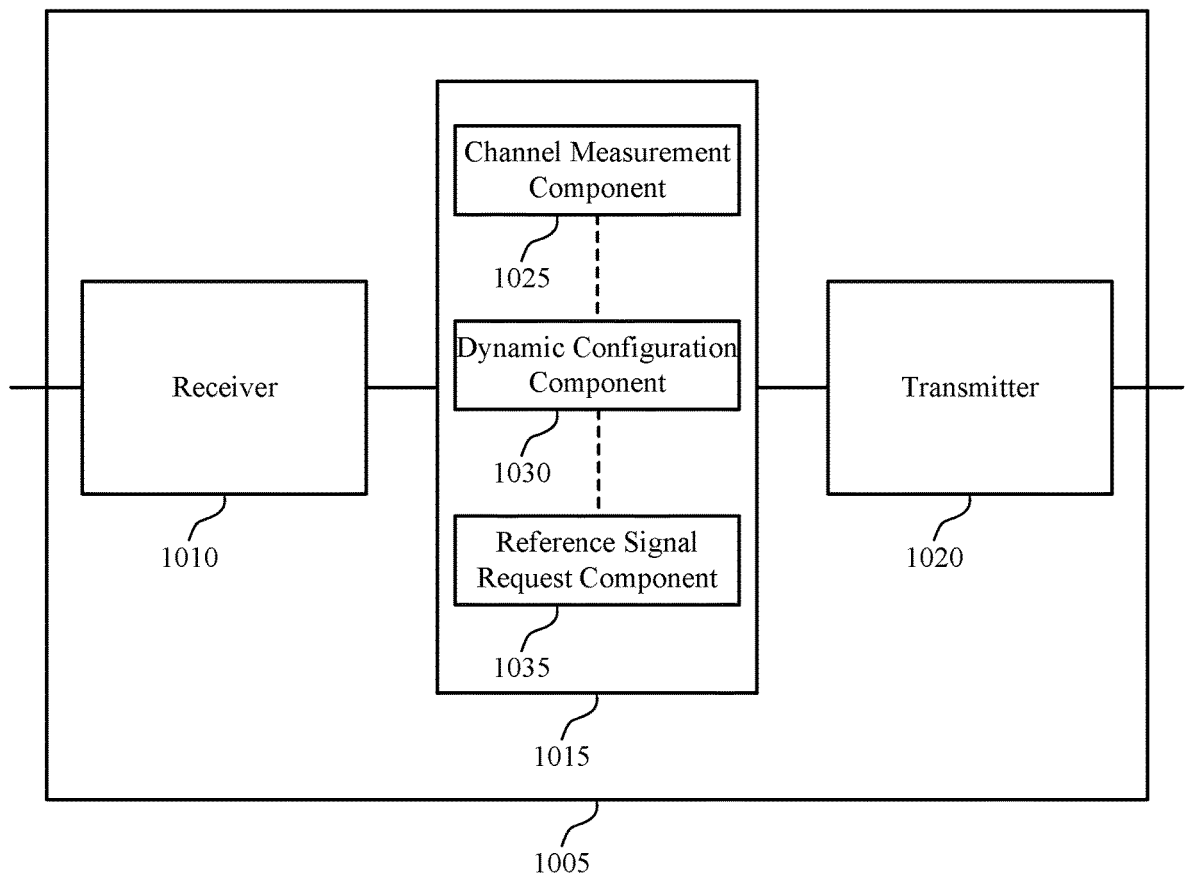

FIG. 10 shows a block diagram 1000 of a device 1005 that supports adapting to delay spread variation in wireless communication systems in accordance with various aspects of the present disclosure. Device 1005 may be an example of aspects of a device 905 or a base station 105 as described with reference to FIGS. 1 and 9. Device 1005 may include receiver 1010, base station delay spread manager 1015, and transmitter 1020. Device 1005 may also include a processor. Each of these components may be in communication with one another (e.g., via one or more buses). In some examples, wireless communication systems may be or include a mmW system.

Receiver 1010 may receive information such as packets, user data, or control information associated with various information channels (e.g., control channels, data channels, and information related to adapting to delay spread variation in wireless communication systems, etc.). Information may be passed on to other components of the device. The receiver 1010 may be an example of aspects of the transceiver 1235 described with reference to FIG. 12.

Base station delay spread manager 1015 may be an example of aspects of the base station delay spread manager 1215 described with reference to FIG. 12. Base station delay spread manager 1015 may also include channel measurement component 1025, dynamic configuration component 1030, and reference signal request component 1035.

Channel measurement component 1025 may receive an indication of one or more propagation channel measurement parameters from a UE 115 (i.e., downlink parameters), the one or more propagation channel measurement parameters including a delay spread parameter, a multipath fading parameter, or a frequency selectivity parameter, transmit a request for the UE 115 to transmit the indication of the one or more propagation channel measurement parameters, where the indication is received based on the request, and identify one or more propagation channel measurement parameters (i.e., uplink parameters) including a delay spread parameter, a multipath fading parameter, or a frequency selectivity parameter.

Dynamic configuration component 1030 may update a reference signal pattern or a symbol prefix configuration based on the indication of the one or more propagation channel measurement parameters, transmit a configuration message to the UE 115 in response to receiving the indication of the one or more propagation channel measurement parameters, the configuration message including an indication of the updated reference signal pattern or symbol prefix configuration, identify a CoMP configuration, a SIMO configuration, a MIMO configuration or additional downlink control information, where the reference signal pattern or the symbol prefix configuration is updated based on the CoMP configuration, the SIMO configuration, the MIMO configuration, or the additional downlink control information, and update a reference signal pattern or a symbol prefix configuration based on the configuration message.

In some cases, the configuration message includes a PDCCH message. In some cases, the PDCCH message includes a common PDCCH message. In some cases, the PDCCH message includes an enhanced frequency or receive power PDCCH message. In some cases, the one or more propagation channel measurement parameters are based on a channel reciprocity of a TDD configuration.

Reference signal request component 1035 may transmit a reference signal request to a UE 115 based on one or more propagation channel measurement parameters, the one or more propagation channel measurement parameters including a delay spread parameter, a multipath fading parameter, or a frequency selectivity parameter.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
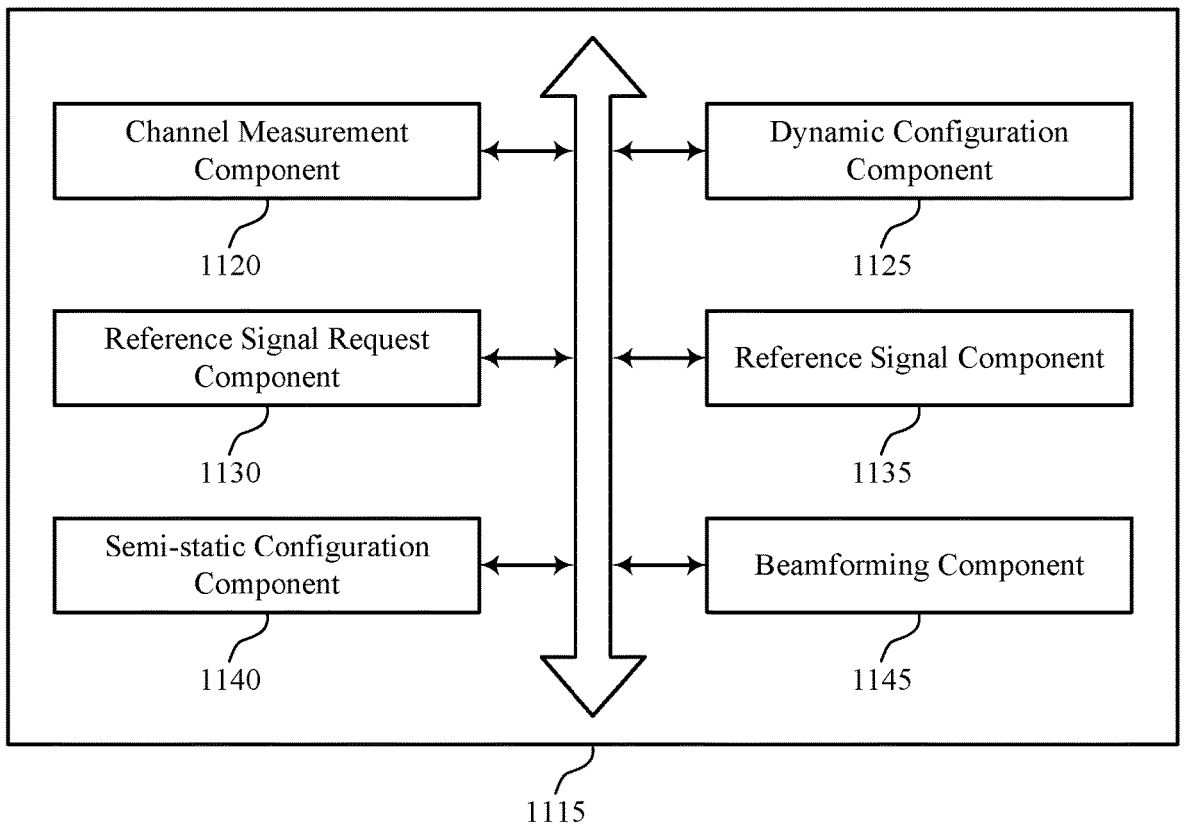

FIG. 11 shows a block diagram 1100 of a base station delay spread manager 1115 that supports adapting to delay spread variation in wireless communication systems in accordance with various aspects of the present disclosure. The base station delay spread manager 1115 may be an example of aspects of a base station delay spread manager 1215 described with reference to FIGS. 9, 10, and 12. The base station delay spread manager 1115 may include channel measurement component 1120, dynamic configuration component 1125, reference signal request component 1130, reference signal component 1135, semi-static configuration component 1140, and beamforming component 1145. Each of these modules may communicate, directly or indirectly, with one another (e.g., via one or more buses). In some examples, wireless communication systems may be or include a mmW system.

Channel measurement component 1120 may receive an indication of one or more propagation channel measurement parameters from a UE 115, the one or more propagation channel measurement parameters including a delay spread parameter, a multipath fading parameter, or a frequency selectivity parameter, transmit a request for the UE 115 to transmit the indication of the one or more propagation channel measurement parameters, where the indication is received based on the request, and identify one or more propagation channel measurement parameters including a delay spread parameter, a multipath fading parameter, or a frequency selectivity parameter.

Dynamic configuration component 1125 may update a reference signal pattern or a symbol prefix configuration based on the indication of the one or more propagation channel measurement parameters, transmit a configuration message to the UE 115 in response to receiving the indication of the one or more propagation channel measurement parameters, the configuration message including an indication of the updated reference signal pattern or symbol prefix configuration, identify a CoMP configuration, a SIMO configuration, a MIMO configuration or additional downlink control information.

Reference signal request component 1130 may transmit a reference signal request to a UE 115 based on one or more propagation channel measurement parameters, the one or more propagation channel measurement parameters including a delay spread parameter, a multipath fading parameter, or a frequency selectivity parameter. Reference signal component 1135 may transmit one or more reference signals based on the updated reference signal pattern.

Semi-static configuration component 1140 may transmit a broadcast system information message or a RRC message, where the reference signal pattern or the symbol prefix configuration is updated based on the broadcast system information message or the RRC message. Beamforming component 1145 may transmit an additional configuration message using a different beamforming direction, where the additional configuration message includes an indication of the updated reference signal pattern or symbol prefix configuration.

Figure 12:
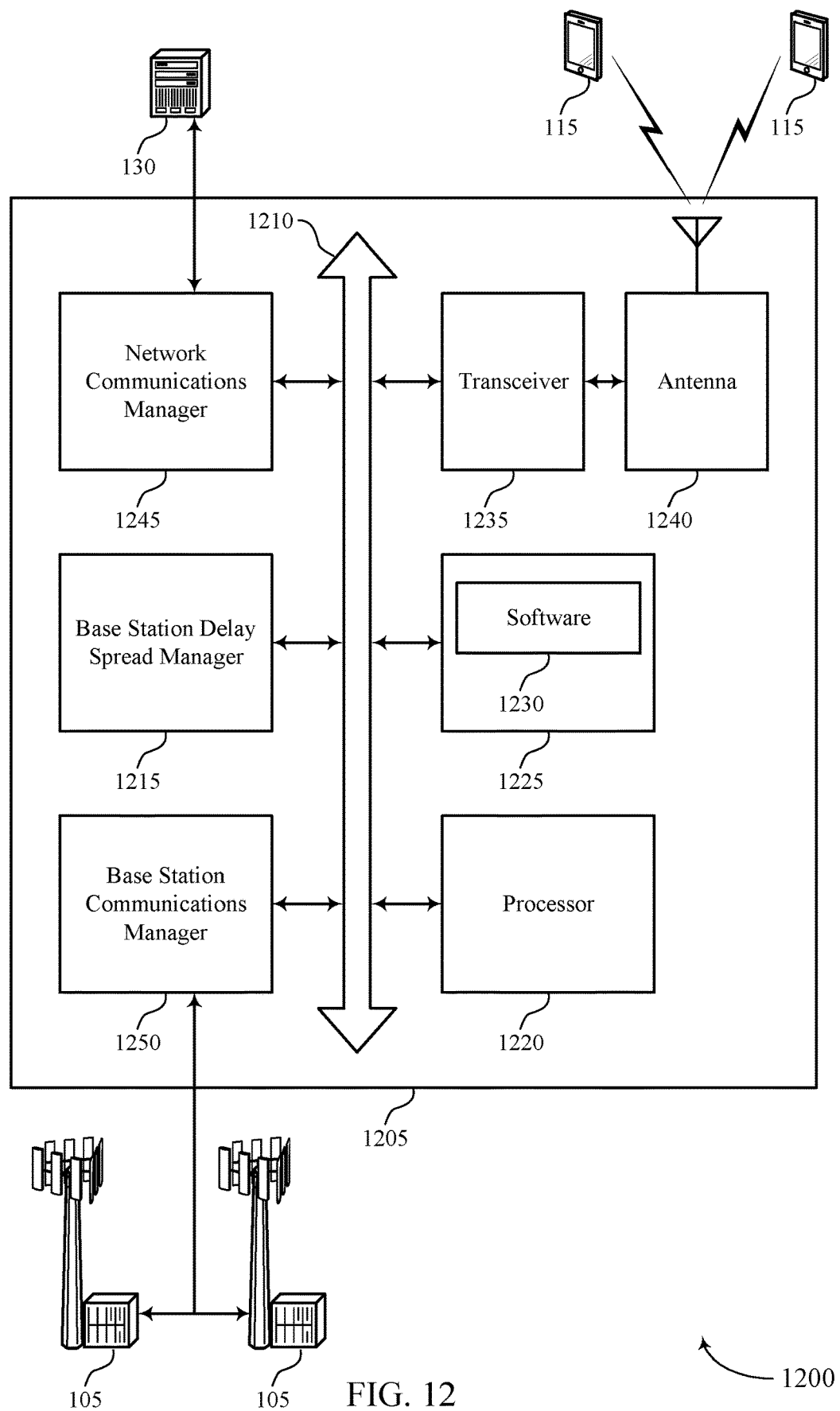
FIG. 12 illustrates a block diagram of a system including a base station that supports adapting to delay spread variation in wireless communication systems in accordance with aspects of the present disclosure.

FIG. 12 shows a diagram of a system 1200 including a device 1205 that supports adapting to delay spread variation in wireless communication systems in accordance with various aspects of the present disclosure. Device 1205 may be an example of or include the components of a base station 105 as described above, e.g., with reference to FIG. 1. Device 1205 may include components for bi-directional voice and data communications including components for transmitting and receiving communications, including base station delay spread manager 1215, processor 1220, memory 1225, software 1230, transceiver 1235, antenna 1240, network communications manager 1245, and base station communications manager 1250. These components may be in electronic communication via one or more busses (e.g., bus 1210). Device 1205 may communicate wirelessly with one or more UEs 115. In some examples, wireless communication systems may be or include a mmW system.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting adapting to delay spread variation in wireless communication systems).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support adapting to delay spread variation in wireless communication systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1250 may manage communications with other base stations 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an LTE/LTE-A wireless communication network technology to provide communication between base stations 105.

Figure 13:
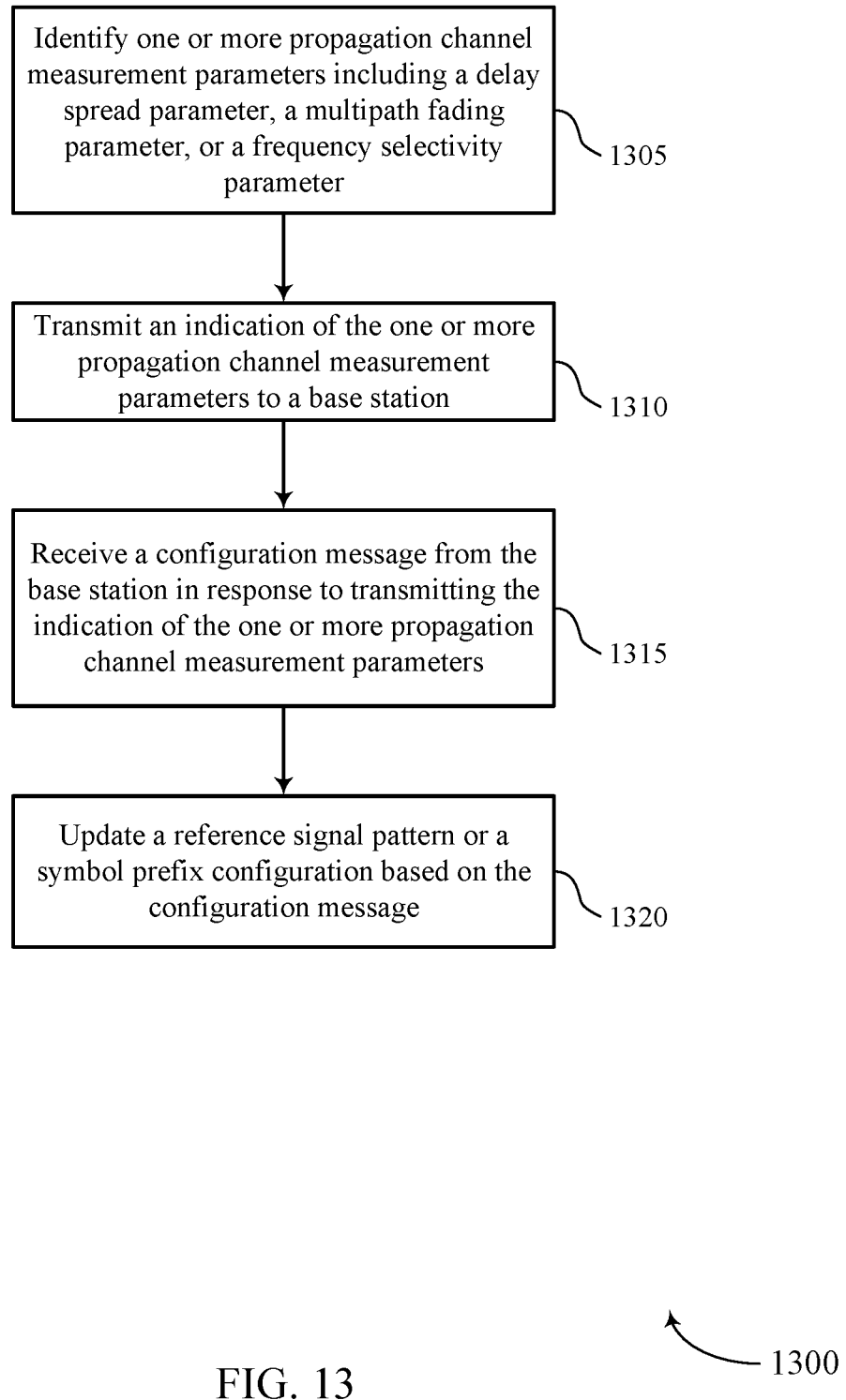
FIGS. 13 through 18 illustrate methods for adapting to delay spread variation in wireless communication systems in accordance with aspects of the present disclosure.

FIG. 13 shows a flowchart illustrating a method 1300 for adapting to delay spread variation in wireless communication systems in accordance with various aspects of the present disclosure. The operations of method 1300 may be implemented by a UE 115 or its components as described herein. For example, the operations of method 1300 may be performed by a UE delay spread manager as described with reference to FIGS. 5 through 8. In some examples, a UE 115 may execute a set of codes to control the functional elements of the device to perform the functions described below. Additionally or alternatively, the UE 115 may perform aspects the functions described below using special-purpose hardware. In some examples, wireless communication systems may be or include a mmW system.

At block 1305 the UE 115 may identify one or more propagation channel measurement parameters including a delay spread parameter, a multipath fading parameter, or a frequency selectivity parameter. The operations of block 1305 may be performed according to the methods described with reference to FIGS. 1 through 4. In certain examples, aspects of the operations of block 1305 may be performed by a channel measurement component as described with reference to FIGS. 5 through 8.

At block 1310 the UE 115 may transmit an indication of the one or more propagation channel measurement parameters to a base station 105. The operations of block 1310 may be performed according to the methods described with reference to FIGS. 1 through 4. In certain examples, aspects of the operations of block 1310 may be performed by a channel measurement indication component as described with reference to FIGS. 5 through 8.

At block 1315 the UE 115 may receive a configuration message from the base station 105 in response to transmitting the indication of the one or more propagation channel measurement parameters. The operations of block 1315 may be performed according to the methods described with reference to FIGS. 1 through 4. In certain examples, aspects of the operations of block 1315 may be performed by a dynamic configuration component as described with reference to FIGS. 5 through 8.

At block 1320 the UE 115 may update a reference signal pattern or a symbol prefix configuration based on the configuration message. The operations of block 1320 may be performed according to the methods described with reference to FIGS. 1 through 4. In certain examples, aspects of the operations of block 1320 may be performed by a dynamic configuration component as described with reference to FIGS. 5 through 8.

Figure 14:
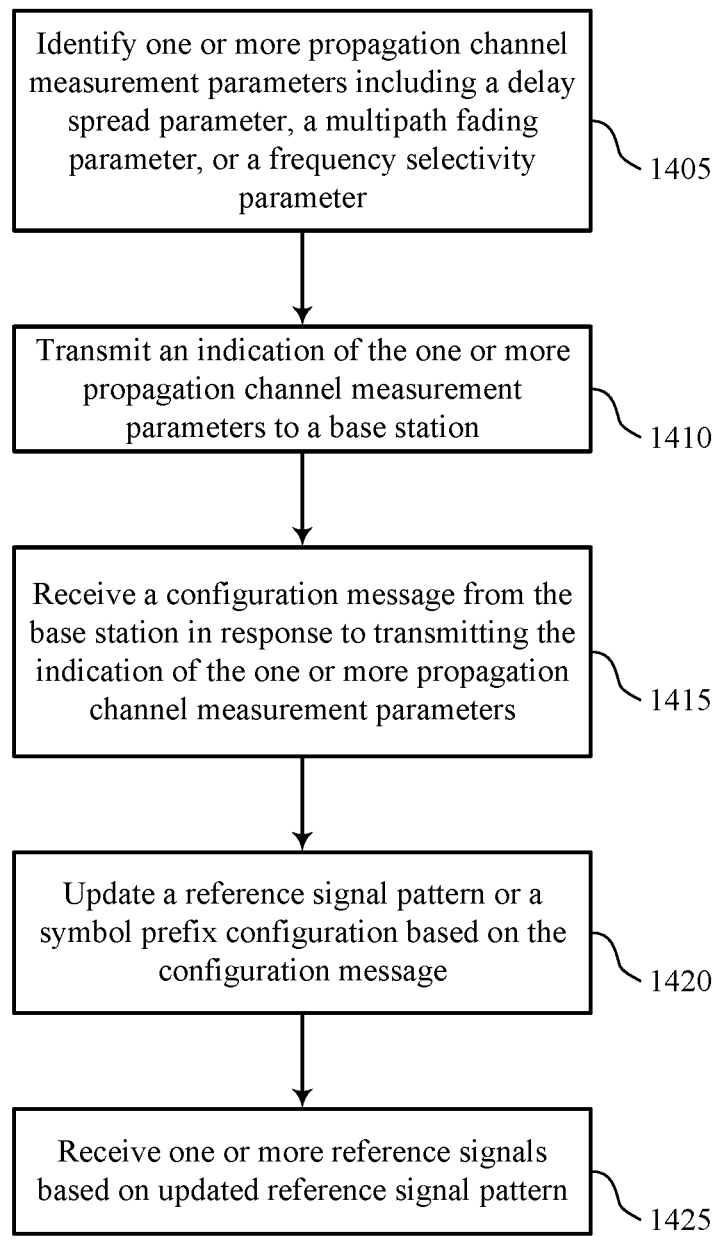

FIG. 14 shows a flowchart illustrating a method 1400 for adapting to delay spread variation in wireless communication systems in accordance with various aspects of the present disclosure. The operations of method 1400 may be implemented by a UE 115 or its components as described herein. For example, the operations of method 1400 may be performed by a UE delay spread manager as described with reference to FIGS. 5 through 8. In some examples, a UE 115 may execute a set of codes to control the functional elements of the device to perform the functions described below. Additionally or alternatively, the UE 115 may perform aspects the functions described below using special-purpose hardware. In some examples, wireless communication systems may be or include a mmW system.

At block 1405 the UE 115 may identify one or more propagation channel measurement parameters including a delay spread parameter, a multipath fading parameter, or a frequency selectivity parameter. The operations of block 1405 may be performed according to the methods described with reference to FIGS. 1 through 4. In certain examples, aspects of the operations of block 1405 may be performed by a channel measurement component as described with reference to FIGS. 5 through 8.

At block 1410 the UE 115 may transmit an indication of the one or more propagation channel measurement parameters to a base station 105. The operations of block 1410 may be performed according to the methods described with reference to FIGS. 1 through 4. In certain examples, aspects of the operations of block 1410 may be performed by a channel measurement indication component as described with reference to FIGS. 5 through 8.

At block 1415 the UE 115 may receive a configuration message from the base station 105 in response to transmitting the indication of the one or more propagation channel measurement parameters. The operations of block 1415 may be performed according to the methods described with reference to FIGS. 1 through 4. In certain examples, aspects of the operations of block 1415 may be performed by a dynamic configuration component as described with reference to FIGS. 5 through 8.

At block 1420 the UE 115 may update a reference signal pattern or a symbol prefix configuration based on the configuration message. The operations of block 1420 may be performed according to the methods described with reference to FIGS. 1 through 4. In certain examples, aspects of the operations of block 1420 may be performed by a dynamic configuration component as described with reference to FIGS. 5 through 8.

At block 1425 the UE 115 may receive one or more reference signals based on the updated reference signal pattern. The operations of block 1425 may be performed according to the methods described with reference to FIGS. 1 through 4. In certain examples, aspects of the operations of block 1425 may be performed by a reference signal component as described with reference to FIGS. 5 through 8.

Figure 15:
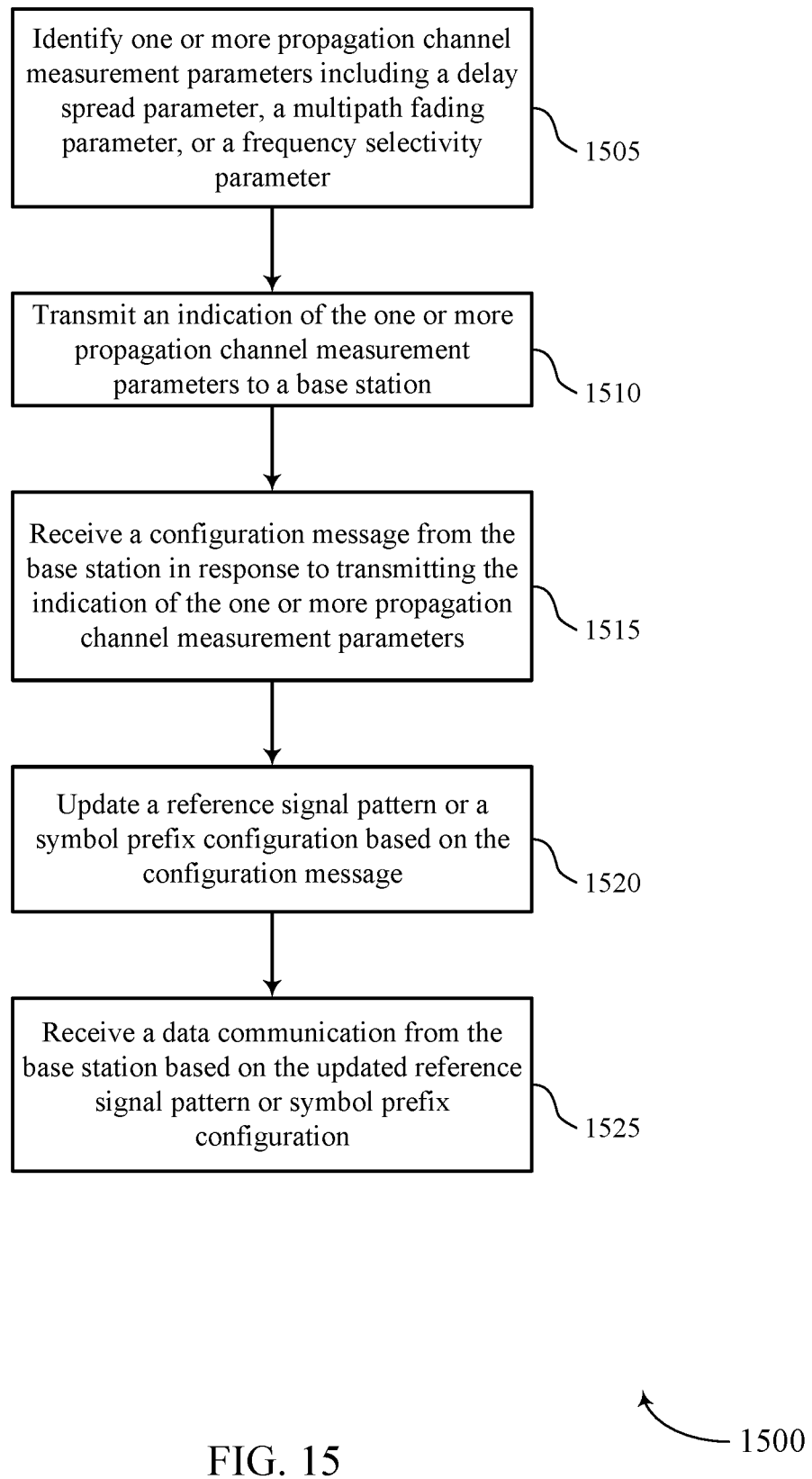

FIG. 15 shows a flowchart illustrating a method 1500 for adapting to delay spread variation in wireless communication systems in accordance with various aspects of the present disclosure. The operations of method 1500 may be implemented by a UE 115 or its components as described herein. For example, the operations of method 1500 may be performed by a UE delay spread manager as described with reference to FIGS. 5 through 8. In some examples, a UE 115 may execute a set of codes to control the functional elements of the device to perform the functions described below. Additionally or alternatively, the UE 115 may perform aspects the functions described below using special-purpose hardware. In some examples, wireless communication systems may be or include a mmW system.

At block 1505 the UE 115 may identify one or more propagation channel measurement parameters including a delay spread parameter, a multipath fading parameter, or a frequency selectivity parameter. The operations of block 1505 may be performed according to the methods described with reference to FIGS. 1 through 4. In certain examples, aspects of the operations of block 1505 may be performed by a channel measurement component as described with reference to FIGS. 5 through 8.

At block 1510 the UE 115 may transmit an indication of the one or more propagation channel measurement parameters to a base station 105. The operations of block 1510 may be performed according to the methods described with reference to FIGS. 1 through 4. In certain examples, aspects of the operations of block 1510 may be performed by a channel measurement indication component as described with reference to FIGS. 5 through 8.

At block 1515 the UE 115 may receive a configuration message from the base station 105 in response to transmitting the indication of the one or more propagation channel measurement parameters. The operations of block 1515 may be performed according to the methods described with reference to FIGS. 1 through 4. In certain examples, aspects of the operations of block 1515 may be performed by a dynamic configuration component as described with reference to FIGS. 5 through 8.

At block 1520 the UE 115 may update a reference signal pattern or a symbol prefix configuration based on the configuration message. The operations of block 1520 may be performed according to the methods described with reference to FIGS. 1 through 4. In certain examples, aspects of the operations of block 1520 may be performed by a dynamic configuration component as described with reference to FIGS. 5 through 8.

At block 1525 the UE 115 may receive a data communication from the base station 105 based on the updated reference signal pattern or symbol prefix configuration. The operations of block 1525 may be performed according to the methods described with reference to FIGS. 1 through 4. In certain examples, aspects of the operations of block 1525 may be performed by a receiver as described with reference to FIGS. 5 through 8.

Figure 16:
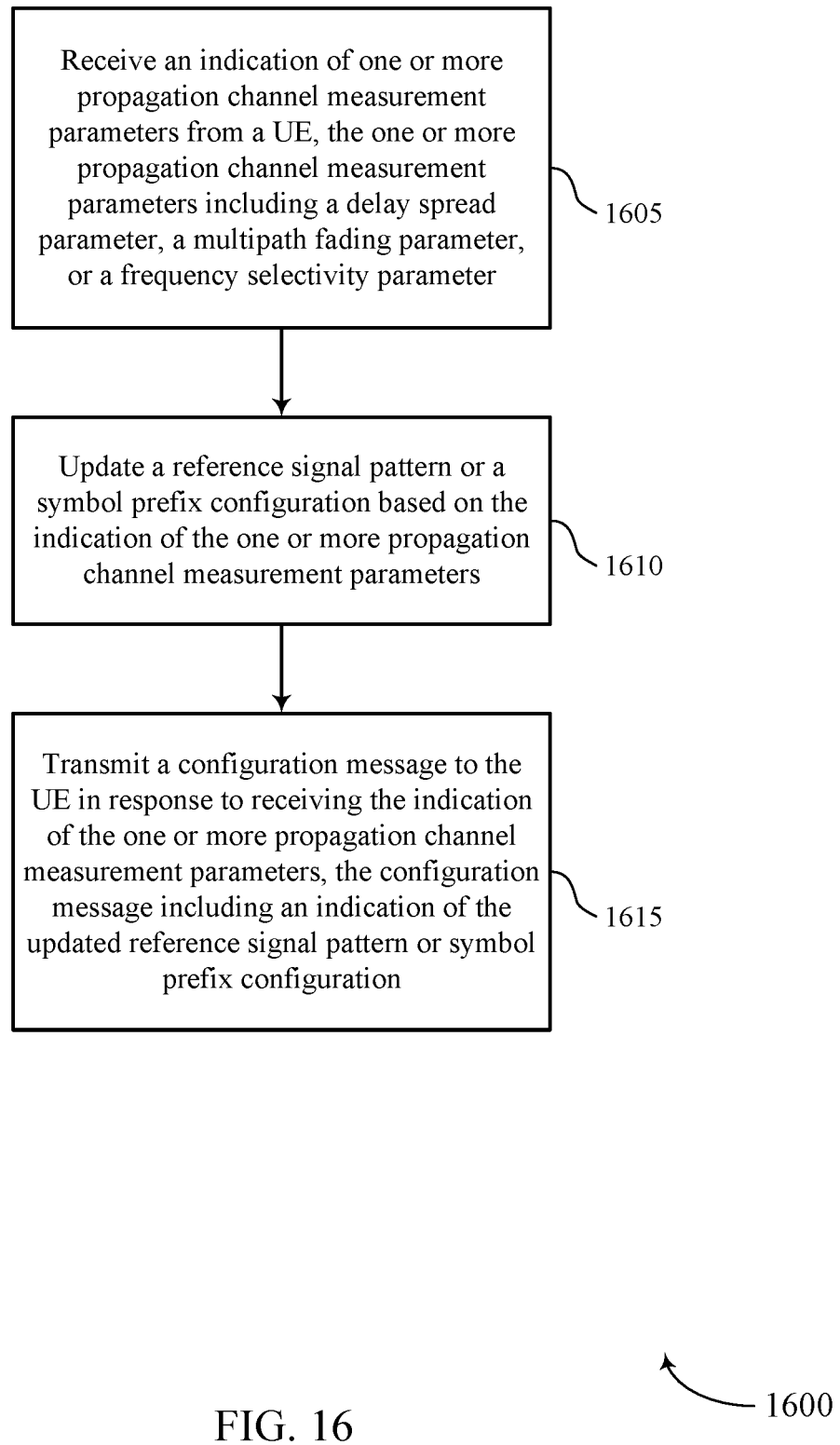

FIG. 16 shows a flowchart illustrating a method 1600 for adapting to delay spread variation in wireless communication systems in accordance with various aspects of the present disclosure. The operations of method 1600 may be implemented by a base station 105 or its components as described herein. For example, the operations of method 1600 may be performed by a base station delay spread manager as described with reference to FIGS. 9 through 12. In some examples, a base station 105 may execute a set of codes to control the functional elements of the device to perform the functions described below. In some examples, wireless communication systems may be or include a mmW system. Additionally or alternatively, the base station 105 may perform aspects the functions described below using special-purpose hardware.

At block 1605 the base station 105 may receive an indication of one or more propagation channel measurement parameters from a UE 115, the one or more propagation channel measurement parameters including a delay spread parameter, a multipath fading parameter, or a frequency selectivity parameter. The operations of block 1605 may be performed according to the methods described with reference to FIGS. 1 through 4. In certain examples, aspects of the operations of block 1605 may be performed by a channel measurement component as described with reference to FIGS. 9 through 12.

At block 1610 the base station 105 may update a reference signal pattern or a symbol prefix configuration based on the indication of the one or more propagation channel measurement parameters. The operations of block 1610 may be performed according to the methods described with reference to FIGS. 1 through 4. In certain examples, aspects of the operations of block 1610 may be performed by a dynamic configuration component as described with reference to FIGS. 9 through 12.

At block 1615 the base station 105 may transmit a configuration message to the UE 115 in response to receiving the indication of the one or more propagation channel measurement parameters, the configuration message including an indication of the updated reference signal pattern or symbol prefix configuration. The operations of block 1615 may be performed according to the methods described with reference to FIGS. 1 through 4. In certain examples, aspects of the operations of block 1615 may be performed by a dynamic configuration component as described with reference to FIGS. 9 through 12.

Figure 17:
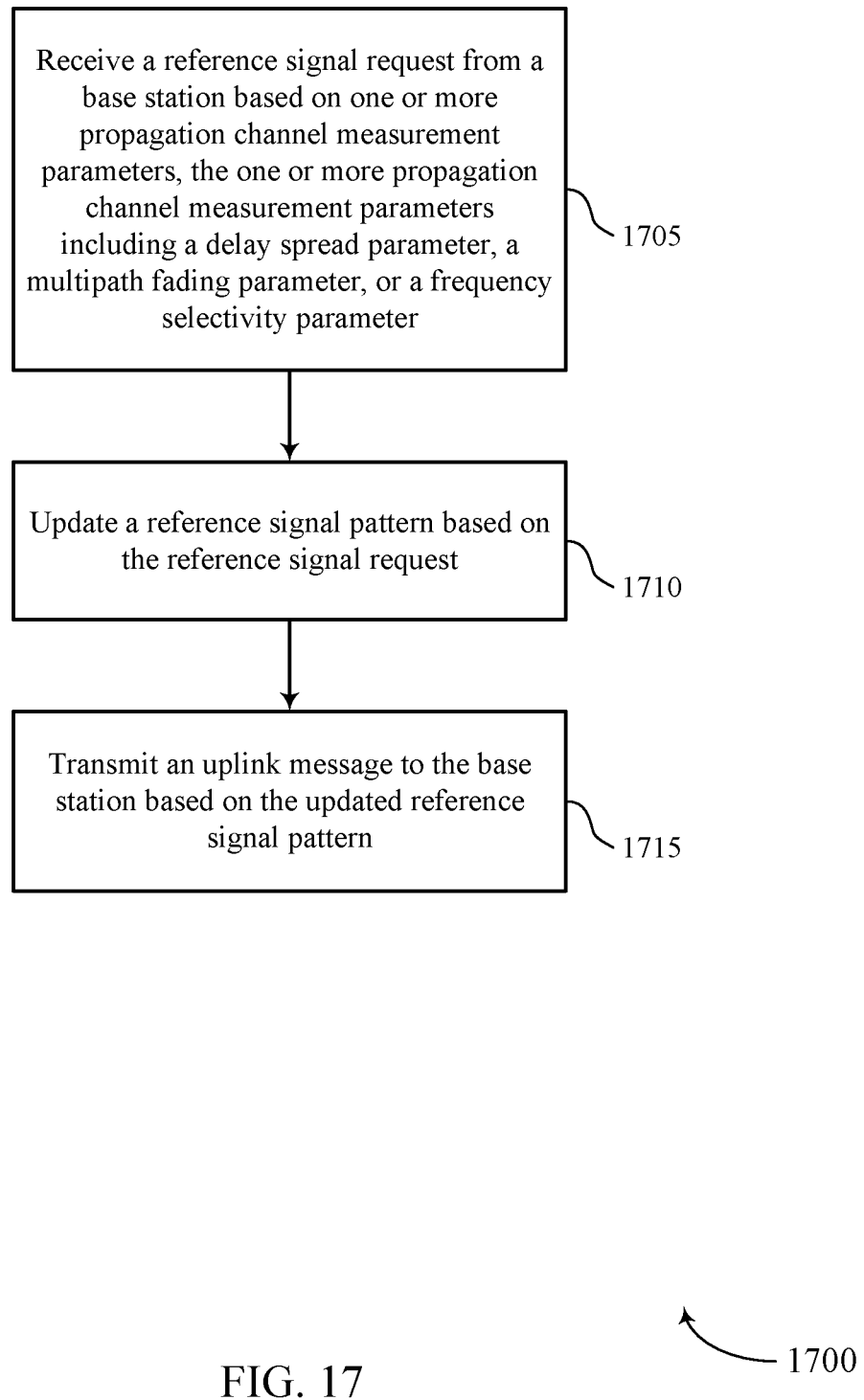

FIG. 17 shows a flowchart illustrating a method 1700 for adapting to delay spread variation in wireless communication systems in accordance with various aspects of the present disclosure. The operations of method 1700 may be implemented by a UE 115 or its components as described herein. For example, the operations of method 1700 may be performed by a UE delay spread manager as described with reference to FIGS. 5 through 8. In some examples, a UE 115 may execute a set of codes to control the functional elements of the device to perform the functions described below.

Additionally or alternatively, the UE 115 may perform aspects the functions described below using special-purpose hardware. In some examples, wireless communication systems may be or include a mmW system.

At block 1705 the UE 115 may receive a reference signal request from a base station 105 based on one or more propagation channel measurement parameters, the one or more propagation channel measurement parameters including a delay spread parameter, a multipath fading parameter, or a frequency selectivity parameter. The operations of block 1705 may be performed according to the methods described with reference to FIGS. 1 through 4. In certain examples, aspects of the operations of block 1705 may be performed by a dynamic configuration component as described with reference to FIGS. 5 through 8.

At block 1710 the UE 115 may update a reference signal pattern based on the reference signal request. The operations of block 1710 may be performed according to the methods described with reference to FIGS. 1 through 4. In certain examples, aspects of the operations of block 1710 may be performed by a dynamic configuration component as described with reference to FIGS. 5 through 8.

At block 1715 the UE 115 may transmit an uplink message to the base station 105 based on the updated reference signal pattern. The operations of block 1715 may be performed according to the methods described with reference to FIGS. 1 through 4. In certain examples, aspects of the operations of block 1715 may be performed by a transmitter as described with reference to FIGS. 5 through 8.

Figure 18:
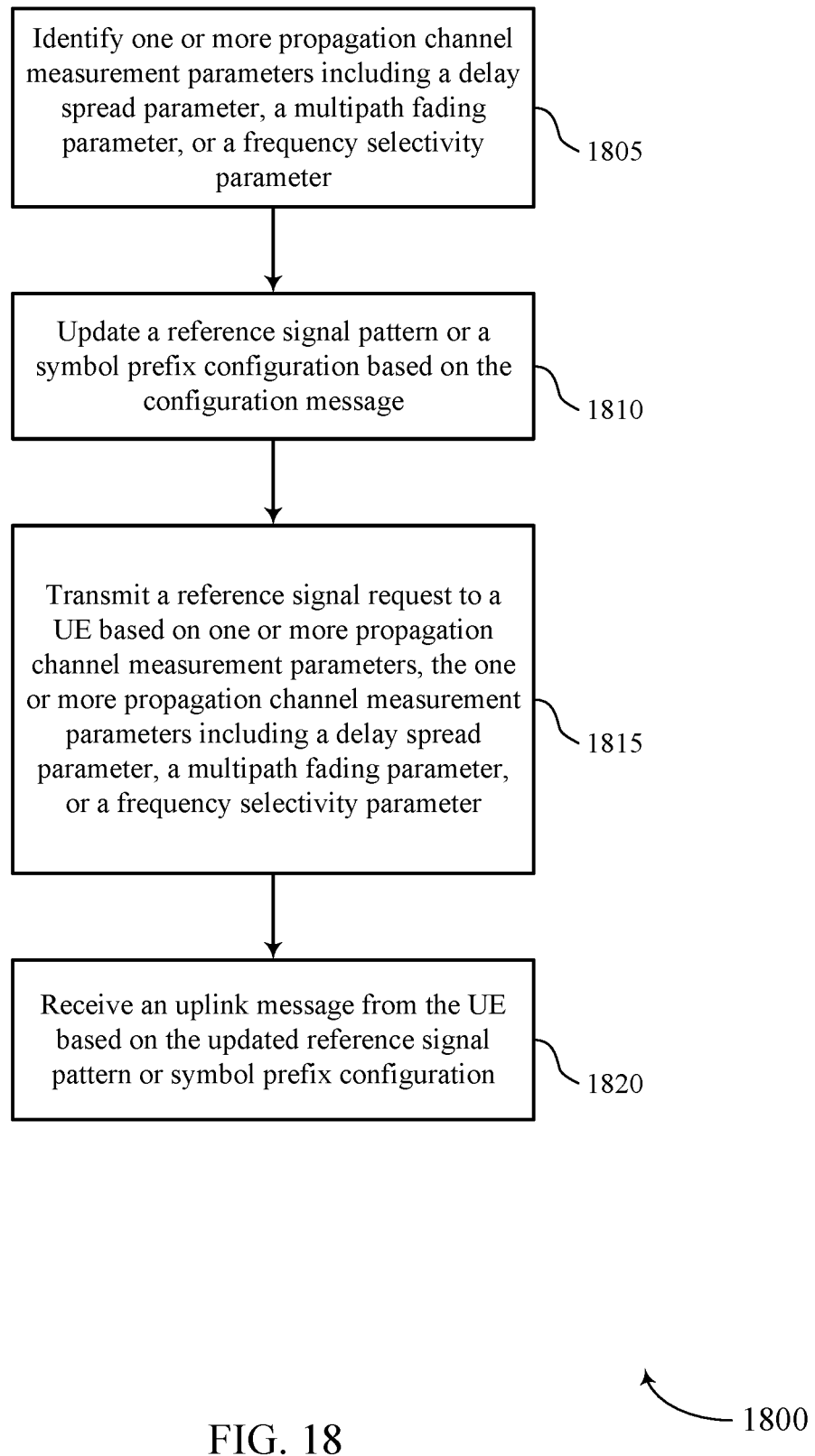

FIG. 18 shows a flowchart illustrating a method 1800 for adapting to delay spread variation in wireless communication systems in accordance with various aspects of the present disclosure. The operations of method 1800 may be implemented by a base station 105 or its components as described herein. For example, the operations of method 1800 may be performed by a base station delay spread manager as described with reference to FIGS. 9 through 12. In some examples, a base station 105 may execute a set of codes to control the functional elements of the device to perform the functions described below. Additionally or alternatively, the base station 105 may perform aspects the functions described below using special-purpose hardware. In some examples, wireless communication systems may be or include a mmW system.

At block 1805 the base station 105 may identify one or more propagation channel measurement parameters including a delay spread parameter, a multipath fading parameter, or a frequency selectivity parameter. The operations of block 1805 may be performed according to the methods described with reference to FIGS. 1 through 4. In certain examples, aspects of the operations of block 1805 may be performed by a channel measurement component as described with reference to FIGS. 9 through 12.

At block 1810 the base station 105 may update a reference signal pattern or a symbol prefix configuration based on the configuration message. The operations of block 1810 may be performed according to the methods described with reference to FIGS. 1 through 4. In certain examples, aspects of the operations of block 1810 may be performed by a dynamic configuration component as described with reference to FIGS. 9 through 12.

At block 1815 the base station 105 may transmit a reference signal request to a UE 115 based on one or more propagation channel measurement parameters, the one or more propagation channel measurement parameters including a delay spread parameter, a multipath fading parameter, or a frequency selectivity parameter. The operations of block 1815 may be performed according to the methods described with reference to FIGS. 1 through 4. In certain examples, aspects of the operations of block 1815 may be performed by a reference signal request component as described with reference to FIGS. 9 through 12.

At block 1820 the base station 105 may receive an uplink message from the UE 115 based on the updated reference signal pattern or symbol prefix configuration. The operations of block 1820 may be performed according to the methods described with reference to FIGS. 1 through 4. In certain examples, aspects of the operations of block 1820 may be performed by a receiver as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying one or more propagation channel measurement parameters comprising a delay spread parameter, a multipath fading parameter, or a frequency selectivity parameter;
   transmitting an indication of the one or more propagation channel measurement parameters to a base station;
   receiving a configuration message comprising an indication of one or more reference signal parameters from the base station in response to transmitting the indication of the one or more propagation channel measurement parameters; and
   updating a reference signal pattern or a symbol prefix configuration based at least in part on the configuration message, wherein the reference signal pattern is associated with the symbol prefix configuration.

2. The method of claim 1, further comprising:
   receiving one or more reference signals based at least in part on the updated reference signal pattern.

3. The method of claim 2, wherein the reference signal pattern comprises a pattern for a channel state information reference signal (CSI-RS), a cell specific reference signal (CRS), a demodulation reference signal (DMRS), a beamforming reference signal (BRS), a beamforming measurement reference signal (MRS), or a sounding reference signal (SRS).

4. The method of claim 1, further comprising:
   receiving a data communication from the base station based at least in part on the updated reference signal pattern or symbol prefix configuration.

5. The method of claim 1, wherein the symbol prefix configuration comprises an orthogonal frequency division multiplexing (OFDM) cyclic prefix configuration, a single carrier frequency division multiplexing (SC-FDM) cyclic prefix configuration, or an SC-FDM guard interval configuration.

6. The method of claim 5, wherein the SC-FDM guard interval configuration comprises an indication of a number of zeroes to be appended or prepended to a data symbol prior to a discrete Fourier transform spreading.

7. The method of claim 1, further comprising:
   receiving a broadcast system information message or a radio resource control (RRC) message, wherein the reference signal pattern or the symbol prefix configuration are updated based at least in part on the broadcast system information message or the RRC message.

8. The method of claim 1, wherein the configuration message comprises a physical downlink control (PDCCH) message.

9. The method of claim 8, wherein the PDCCH message comprises a common PDCCH message.

10. The method of claim 9, wherein the PDCCH message comprises an enhanced frequency or transmit power PDCCH message.

11. The method of claim 1, further comprising:
    identifying a coordinated multipoint (CoMP) configuration, a single-input multiple-output (SIMO) configuration, a multiple-input multiple-output (MIMO) configuration or additional downlink control information, wherein the reference signal pattern or the symbol prefix configuration is updated based on the CoMP configuration, the SIMO configuration, the MIMO configuration, or the additional downlink control information.

12. The method of claim 1, wherein the indication is transmitted based at least in part on a periodic reporting configuration.

13. The method of claim 1, further comprising:
    receiving a request to transmit the indication of the one or more propagation channel measurement parameters from the base station, wherein the indication is transmitted based at least in part on the request.

14. The method of claim 1, wherein the symbol prefix configuration comprises a plurality of cyclic prefix durations associated with a plurality of symbol periods of a subframe, or a plurality of symbol periods of a slot, or a combination thereof.

15. The method of claim 1, wherein the configuration message comprises a mapping between a subframe number and a cyclic prefix duration, or a mapping between a slot number and the cyclic prefix duration, and wherein the symbol prefix configuration is updated based at least in part on the mapping and the subframe number or the mapping and the slot number.

16. The method of claim 1, wherein the configuration message comprises a combined indication of the reference signal pattern and the symbol prefix configuration.

17. A method for wireless communication, comprising:
receiving an indication of one or more propagation channel measurement parameters from a user equipment (UE), the one or more propagation channel measurement parameters comprising a delay spread parameter, a multipath fading parameter, or a frequency selectivity parameter;
updating a reference signal pattern or a symbol prefix configuration based at least in part on the indication of the one or more propagation channel measurement parameters, wherein the reference signal pattern is associated with the symbol prefix configuration; and
transmitting a configuration message to the UE in response to receiving the indication of the one or more propagation channel measurement parameters, the configuration message comprising an indication of the updated reference signal pattern or symbol prefix configuration, the indication of the updated reference signal pattern comprising an indication of one or more reference signal parameters.

18. The method of claim 17, further comprising:
transmitting one or more reference signals based at least in part on the updated reference signal pattern.

19. The method of claim 17, further comprising:
transmitting a data communication to the UE based at least in part on the updated reference signal pattern or symbol prefix configuration.

20. The method of claim 17, further comprising:
transmitting a broadcast system information message or a radio resource control (RRC) message, wherein the reference signal pattern or the symbol prefix configuration is updated based at least in part on the broadcast system information message or the RRC message.

21. The method of claim 17, wherein the configuration message comprises a physical downlink control (PDCCH) message.

22. The method of claim 21, wherein the PDCCH message comprises a common PDCCH message.

23. The method of claim 22, wherein the PDCCH message comprises an enhanced frequency or receive power PDCCH message.

24. The method of claim 17, further comprising:
identifying a coordinated multipoint (CoMP) configuration, a single-input multiple-output (SIMO) configuration, a multiple-input multiple-output (MIMO) configuration or additional downlink control information, wherein the reference signal pattern or the symbol prefix configuration is updated based on the CoMP configuration, the SIMO configuration, the MIMO configuration, or the additional downlink control information.

25. The method of claim 17, further comprising:
transmitting a request for the UE to transmit the indication of the one or more propagation channel measurement parameters, wherein the indication is received based at least in part on the request.

26. A method for wireless communication, comprising:
receiving a reference signal request from a base station based at least in part on one or more propagation channel measurement parameters, the one or more propagation channel measurement parameters comprising a delay spread parameter, a multipath fading parameter, or a frequency selectivity parameter, wherein the reference signal request comprises a configuration indication of one or more reference signal parameters;
updating a reference signal pattern based at least in part on the configuration indication of the one or more reference signal parameters of the reference signal request; and
transmitting an uplink message to the base station in response to the reference signal request and based at least in part on the updated reference signal pattern.

27. The method of claim 26, wherein the uplink message comprises a sounding reference signal (SRS) or a beamforming measurement reference signal (MRS).

28. A method for wireless communication, comprising:
identifying one or more propagation channel measurement parameters comprising a delay spread parameter, a multipath fading parameter, or a frequency selectivity parameter;
updating a reference signal pattern or a symbol prefix configuration based at least in part on the one or more propagation channel measurement parameters;
transmitting a reference signal request to a user equipment (UE), wherein the reference signal request indicates the updated reference signal pattern or the updated symbol prefix configuration, wherein the reference signal request comprises an indication of one or more reference signal parameters; and
receiving an uplink message from the UE in response to the reference signal request, wherein the uplink message is based at least in part on the reference signal pattern or the symbol prefix configuration.

29. The method of claim 28, wherein the uplink message comprises a sounding reference signal (SRS) or a beamforming measurement reference signal (MRS).

30. The method of claim 28, wherein the one or more propagation channel measurement parameters are based at least in part on a channel reciprocity of a time division duplexing (TDD) configuration.

* * * * *